US012441540B2

(12) United States Patent
Haddick et al.

(10) Patent No.: US 12,441,540 B2
(45) Date of Patent: Oct. 14, 2025

(54) ATTACHMENT SYSTEM FOR REFUSE VEHICLE

(71) Applicant: Oshkosh Corporation, Oshkosh, WI (US)

(72) Inventors: Brian J. Haddick, Rochester, MN (US); Jarud H. Hoefker, Dodge Center, MN (US); Leslie H. Schwartz, Owatonna, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/738,919

(22) Filed: Jun. 10, 2024

(65) Prior Publication Data

US 2024/0327115 A1 Oct. 3, 2024

Related U.S. Application Data

(63) Continuation of application No. 17/219,382, filed on Mar. 31, 2021, now Pat. No. 12,030,714, which is a continuation of application No. 16/691,002, filed on Nov. 21, 2019, now Pat. No. 10,994,929, which is a continuation of application No. 16/413,966, filed on May 16, 2019, now Pat. No. 10,513,392, which is a continuation of application No. 16/047,903, filed on Jul. 27, 2018, now Pat. No. 10,351,340, which is a continuation of application No. 15/610,421, filed on May 31, 2017, now Pat. No. 10,035,648.

(60) Provisional application No. 62/344,306, filed on Jun. 1, 2016.

(51) Int. Cl.
*B65F 3/02* (2006.01)
*B65F 3/04* (2006.01)

(52) U.S. Cl.
CPC . *B65F 3/02* (2013.01); *B65F 3/04* (2013.01)

(58) Field of Classification Search
CPC .................................... B65F 3/04; B65F 3/02
See application file for complete search history.

(56) References Cited

U.S. PATENT DOCUMENTS 3,016,157 A 1/1962 Brisson
3,790,011 A 2/1974 Owen
4,119,225 A 10/1978 Macht et al.
4,436,477 A 3/1984 Lenertz et al.
(Continued)

FOREIGN PATENT DOCUMENTS

DE 10 2009 046 213 A1 5/2011
EP 1 947 249 A2 7/2008

*Primary Examiner* — Bryan A Evans
(74) *Attorney, Agent, or Firm* — Foley & Lardner LLP

(57) ABSTRACT

A refuse vehicle system includes refuse vehicle with a lift assembly and a carry can. The lift assembly includes a pair of lift arms, one or more first actuators configured to pivot the pair of lift arms, an attachment assembly coupled to ends of the pair of lift arms, and one or more second actuators. The carry can is coupled to the attachment assembly. The carry can includes a refuse container and an attachment interface coupled directly to a rear wall of the refuse container. The attachment interface includes a first mounting interface and a second mounting interface spaced from the first mounting interface. The first mounting interface and the second mounting interface are configured to engage with the attachment assembly to couple the carry can to the lift assembly with a fork-less attachment.

20 Claims, 30 Drawing Sheets

(56) References Cited

U.S. PATENT DOCUMENTS

| | | | |
|---|---|---|---|
| 5,098,252 A | 3/1992 | Sheesley et al. | |
| 5,107,610 A | 4/1992 | Fusco | |
| 5,119,894 A | 6/1992 | Crawford et al. | |
| 5,215,155 A | 6/1993 | Van Der Velden | |
| 5,562,397 A | 10/1996 | Albright | |
| 5,727,342 A | 3/1998 | Horton | |
| 5,727,637 A | 3/1998 | Kono et al. | |
| 5,769,596 A | 6/1998 | Burton | |
| 6,062,319 A | 5/2000 | Schwalenberg et al. | |
| 6,375,405 B1 | 4/2002 | Kallevig | |
| 7,014,385 B2 | 3/2006 | Lim et al. | |
| 8,117,773 B2 | 2/2012 | Seda et al. | |
| 9,624,641 B2 | 4/2017 | Martin et al. | |
| 10,377,568 B2 | 8/2019 | Rimsa | |
| 10,737,880 B2 * | 8/2020 | Gentry | B65F 3/046 |
| 2006/0210384 A1 | 9/2006 | Warren | |
| 2013/0243554 A1 | 9/2013 | Rowland et al. | |
| 2015/0071700 A1 | 3/2015 | Miller | |
| 2019/0367270 A1 * | 12/2019 | Rimsa | B65F 3/046 |
| 2020/0087063 A1 | 3/2020 | Haddick et al. | |

* cited by examiner

ATTACHMENT SYSTEM FOR REFUSE VEHICLE

CROSS-REFERENCE TO RELATED PATENT APPLICATIONS

This application is a continuation of U.S. patent application Ser. No. 17/219,382, filed Mar. 31, 2021, which is a continuation of U.S. patent application Ser. No. 16/691,002, filed Nov. 21, 2019, which is a continuation of U.S. patent application Ser. No. 16/413,966, filed May 16, 2019, which is a continuation of U.S. patent application Ser. No. 16/047,903, filed Jul. 27, 2018, which is a continuation of U.S. patent application Ser. No. 15/610,421, filed May 31, 2017, which claims the benefit of U.S. Provisional Patent Application No. 62/344,306, filed Jun. 1, 2016, all of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle system. The refuse vehicle system includes a refuse vehicle and a carry can. The refuse vehicle includes a chassis, a refuse body coupled to the chassis, a cab coupled to the chassis, and a lift assembly coupled to at least one of the chassis or the refuse body. The lift assembly extends forward of the cab. The lift assembly includes a pair of lift arms having proximal ends coupled to the at least one of the chassis or the refuse body, one or more first actuators configured to pivot the pair of lift arms, an attachment assembly coupled to distal ends of the pair of lift arms, and one or more second actuators. The carry can is coupled to the attachment assembly. The carry can includes a refuse container, an articulating collection arm coupled to the refuse container, and an attachment interface coupled directly to a rear wall of the refuse container. The attachment interface includes a first mounting interface and a second mounting interface spaced from the first mounting interface. The first mounting interface and the second mounting interface are positioned along the rear wall and configured to engage with the attachment assembly to couple the carry can to the lift assembly with a fork-less attachment. The one or more second actuators are configured to pivot at least one of the attachment assembly or the carry can relative to the pair of lift arms.

Another embodiment relates to a refuse vehicle system. The refuse vehicle system includes a refuse vehicle and a carry can. The refuse vehicle includes a chassis, a refuse body coupled to the chassis, a cab coupled to the chassis, and a lift assembly coupled to at least one of the chassis or the refuse body. The lift assembly extends forward of the cab. The lift assembly includes a pair of lift arms having proximal ends coupled to the at least one of the chassis or the refuse body, one or more first actuators configured to pivot the pair of lift arms, an attachment assembly coupled to distal ends of the pair of lift arms, and one or more second actuators. The carry can is coupled to the attachment assembly. The carry can includes a refuse container, an articulating collection arm coupled to the refuse container, and an attachment interface coupled to the refuse container. The attachment interface includes a first mounting interface and a second mounting interface spaced from the first mounting interface. The first mounting interface and the second mounting interface are configured to engage with the attachment assembly to couple the carry can to the lift assembly with a fork-less attachment. Each of the first mounting interface and the second mounting interface defines an aperture that receives a component of the attachment assembly. The one or more second actuators are configured to pivot at least one of the attachment assembly or the carry can relative to the pair of lift arms.

Still another embodiment relates to a refuse vehicle system. The refuse vehicle system includes a carry can configured to couple to an attachment assembly of a refuse vehicle. The carry can includes a refuse container and an attachment interface coupled to the refuse container. The attachment interface includes a first mounting interface and a second mounting interface spaced from the first mounting interface. The first mounting interface and the second mounting interface are configured to engage with the attachment assembly to couple the carry can to a lift assembly of the refuse vehicle with a fork-less attachment. Each of the first mounting interface and the second mounting interface defines an aperture that receives a component of the attachment assembly.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an attachment system for a vehicle (e.g., a refuse vehicle, a front-loading refuse vehicle, a rear-loading refuse vehicle, a side-loading refuse vehicle, a skid-loader, a telehandler, a truck, a boom lift, etc.) is configured to facilitate selectively and releasably securing an attachment (e.g., a container attachment, a fork attachment, a plow attachment, a bucket attachment, a street sweeper attachment, a grabber attachment, a cart tipper attachment, etc.) to a lift assembly of the vehicle. Such an attachment system may advantageously allow an operator of the vehicle to use the vehicle for various applications and/or switch attachments for the vehicle with relative ease. By way of example, a container attachment may be attached to the vehicle such that the vehicle may be used for residential refuse collection (e.g., to collect refuse from smaller, residential refuse containers, etc.). By way of another example, a fork attachment may be attached to the vehicle such that the vehicle may be used for commercial refuse collection (e.g., to collect refuse from larger, commercial refuse containers, etc.). By way of yet another example, a plow attachment may be attached to the vehicle such that the vehicle may be used for snow removal. By way of still another example, a street sweeper attachment may be attached to the vehicle such that the vehicle maybe used to remove debris, dirt, etc. from streets, parking lots, etc.

Figure 1:
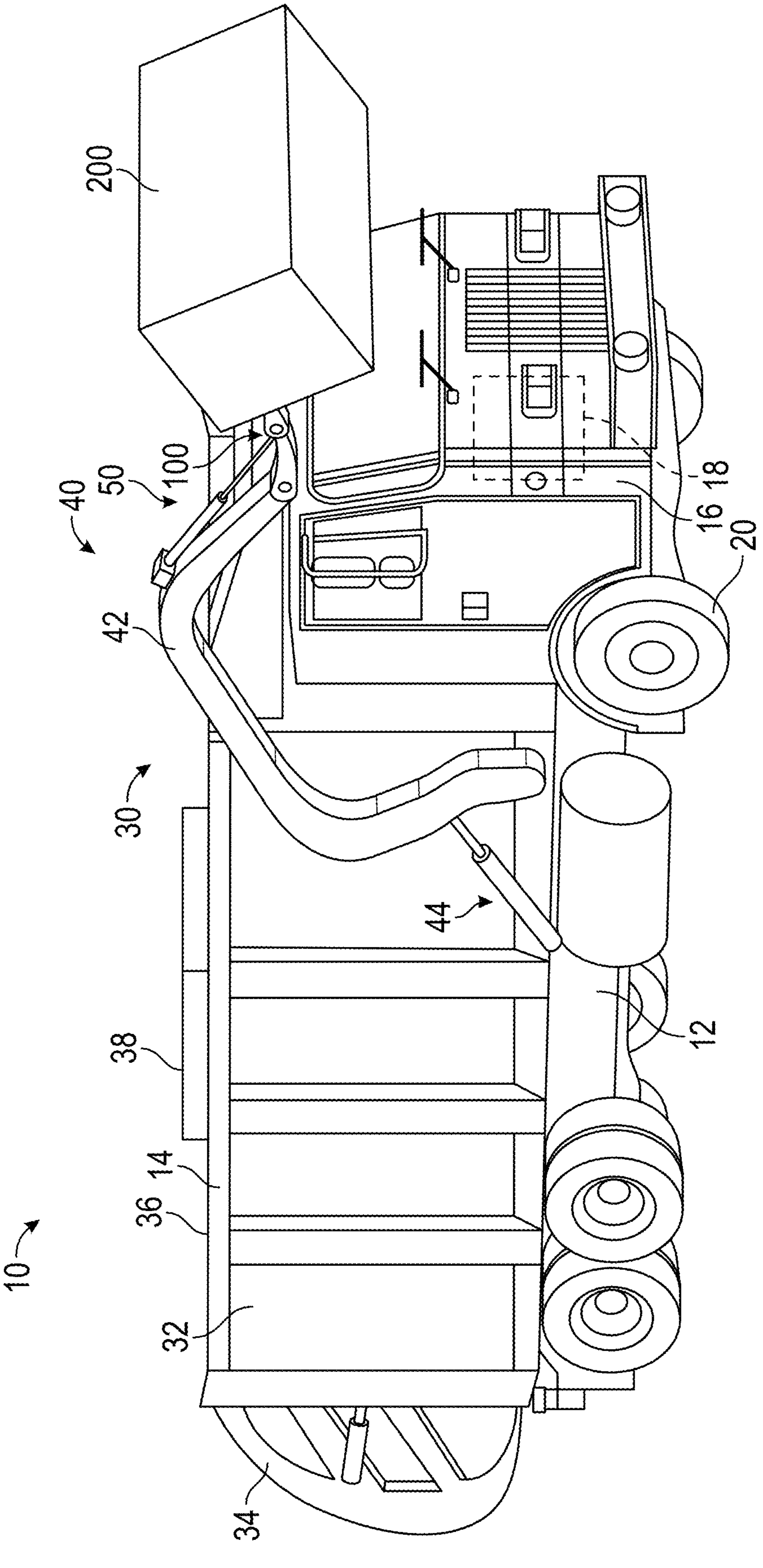
FIG. 1 is a perspective view of a refuse vehicle, according to an exemplary embodiment.

According to the exemplary embodiment shown in FIGS. 1-20, a vehicle, shown as refuse vehicle 10 (e.g., a garbage truck, a waste collection truck, a sanitation truck, etc.), is configured as a front-loading refuse truck having a first attachment assembly, shown as attachment assembly 100. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a plurality of tractive elements, shown as wheels 20, and/or to other systems of the refuse vehicle 10 (e.g., a pneumatic system, a hydraulic system, etc.). The engine 18 may be configured to utilize one or more of a variety of fuels (e.g., gasoline, diesel, biodiesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes a first lift mechanism/system (e.g., a front-loading lift assembly, etc.), shown as lift assembly 40. The lift assembly 40 includes a pair of arms, shown as lift arms 42, coupled to the frame 12 and/or the body 14 on either side of the refuse vehicle 10 such that the lift arms 42 extend forward of the cab 16 (e.g., a front-loading refuse vehicle, etc.). In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). The lift arms 42 may be rotatably coupled to frame 12 with a pivot (e.g., a lug, a shaft, etc.). As shown in FIG. 1, the lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment.

Figure 8:
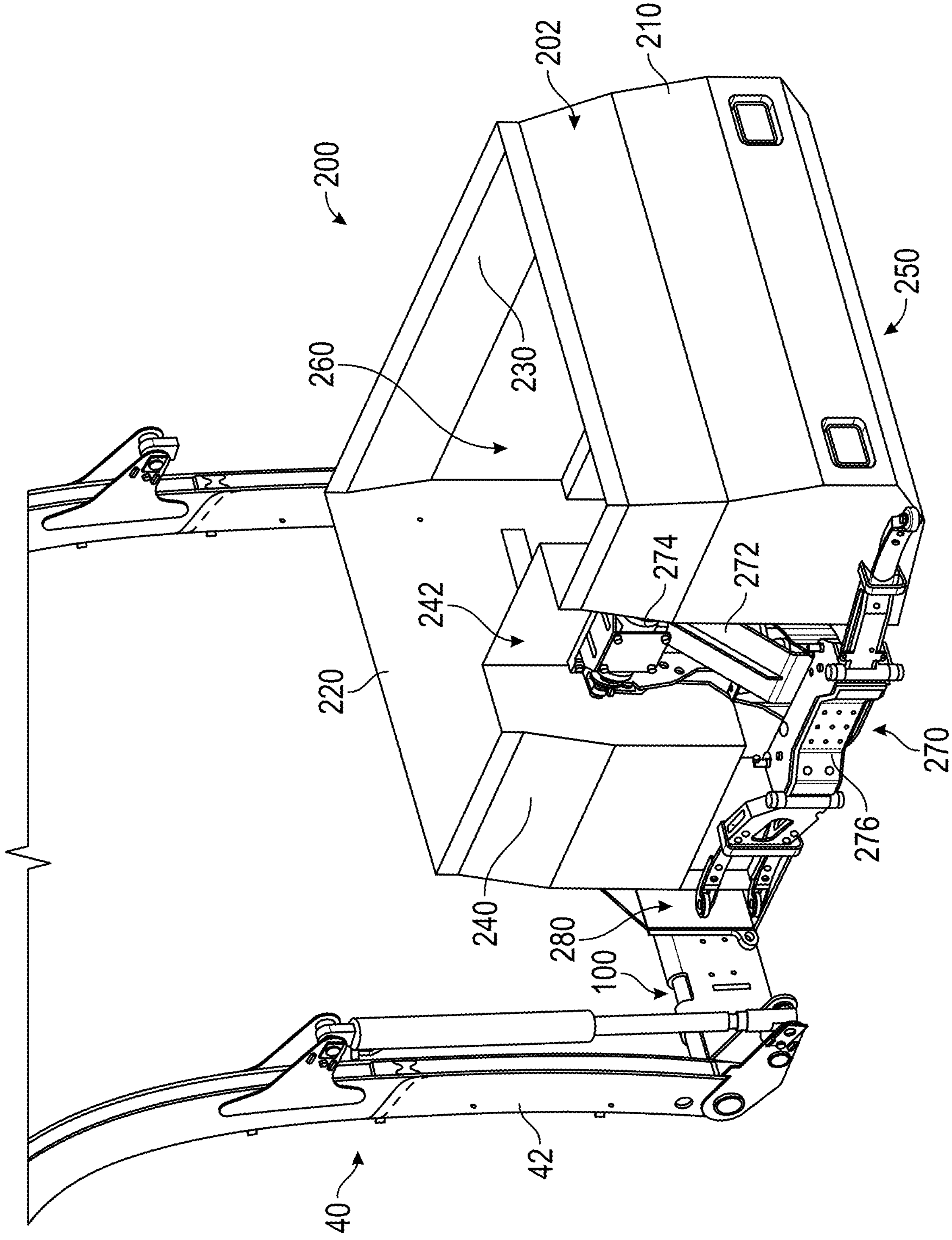
FIG. 8 is a front perspective view of a first attachment coupled to the attachment assembly of FIG. 3, according to an exemplary embodiment.
Figure 16:
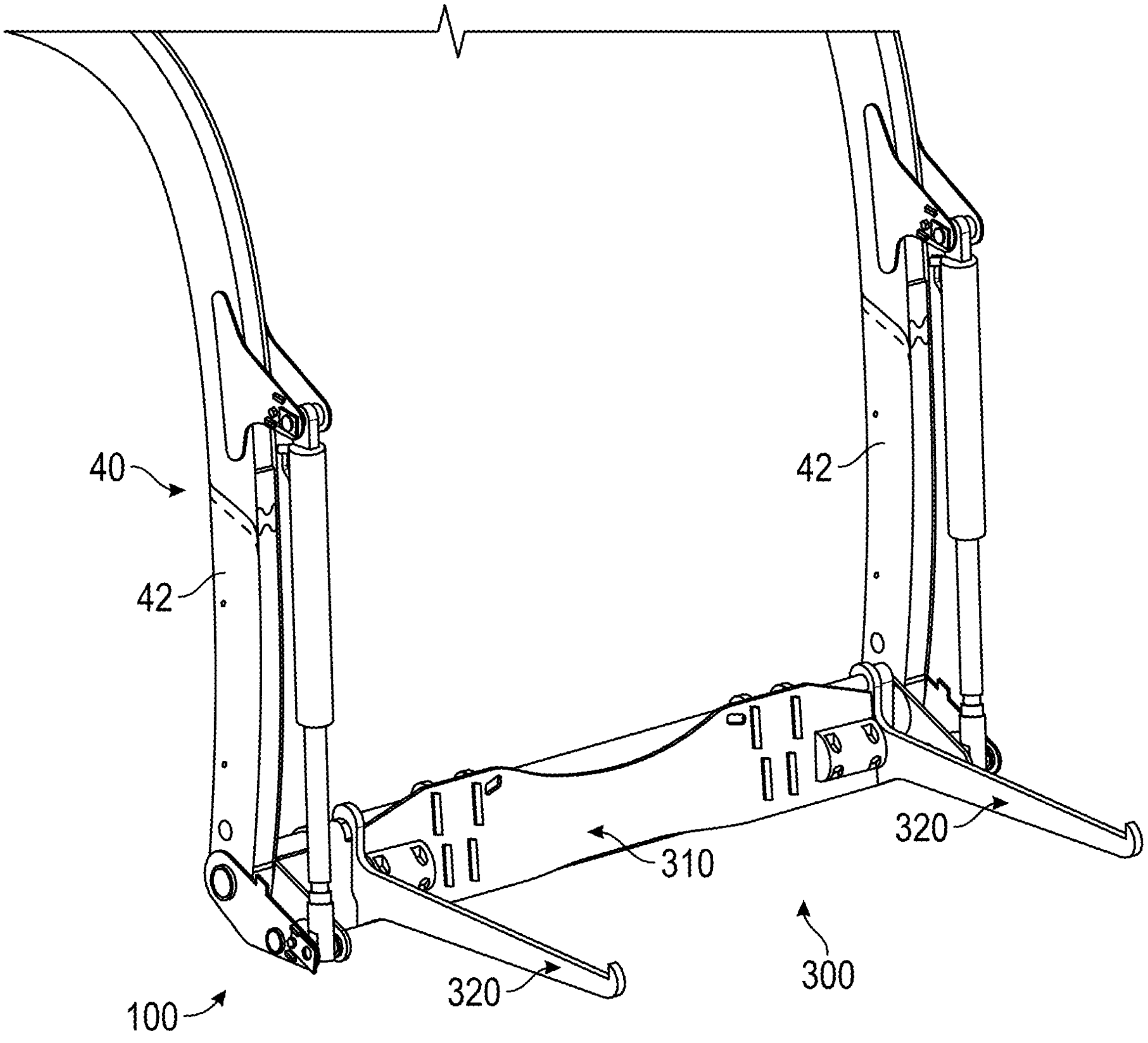
FIG. 16 is a front perspective view of a second attachment coupled to the attachment assembly of FIG. 3, according to an exemplary embodiment.
Figure 17:
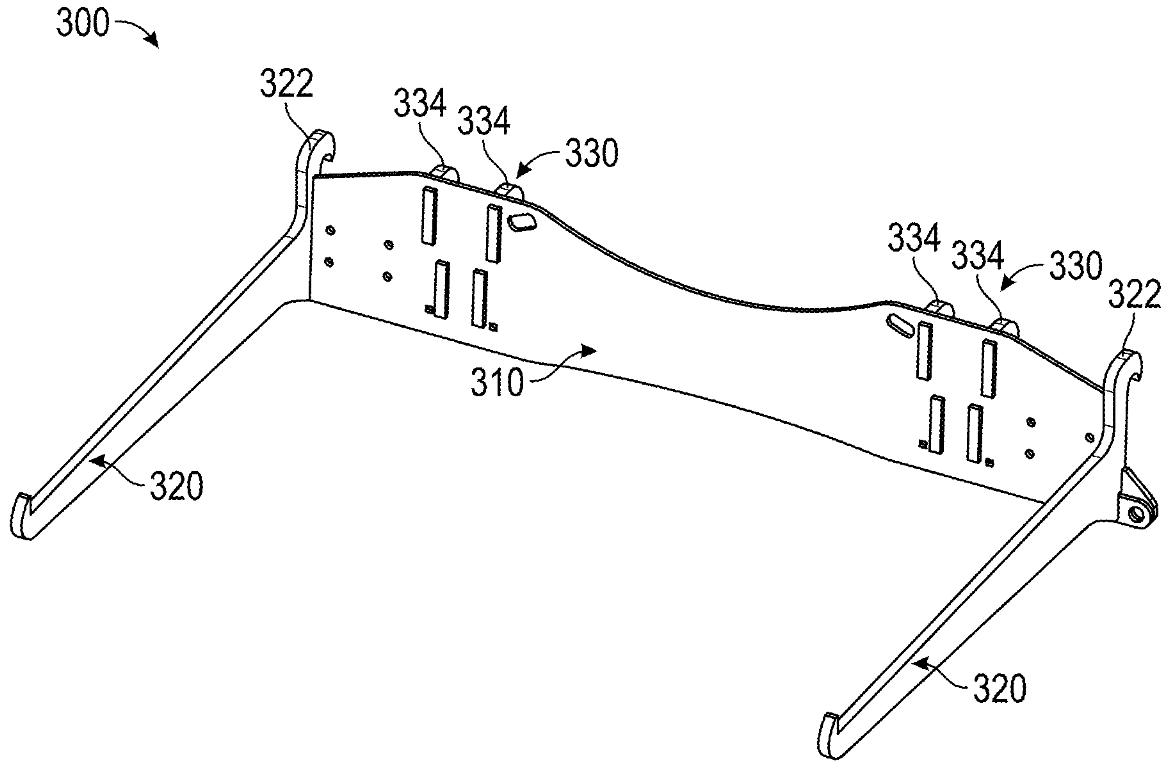
FIGS. 17 and 18 are various perspective views of the second attachment of FIG. 16, according to an exemplary embodiment.

As shown in FIGS. 1, 2, 8, and 16, the attachment assembly 100 is coupled to the lift arms 42 of the lift assembly 40. As shown in FIGS. 1 and 8, the attachment assembly 100 is configured to engage with a first attachment, shown as container attachment 200, to selectively and releasably secure the container attachment 200 to the lift assembly 40. As shown in FIG. 16, the attachment assembly 100 is configured to engage with a second attachment, shown as fork attachment 300, to selectively and releasably secure the fork attachment 300 to the lift assembly 40. In other embodiments, the attachment assembly 100 is configured to engage with another type of attachment (e.g., a street sweeper attachment, a snow plow attachment, a snowblower attachment, a towing attachment, a wood chipper attachment, a bucket attachment, a cart tipper attachment, a grabber attachment, etc.).

Figure 2:
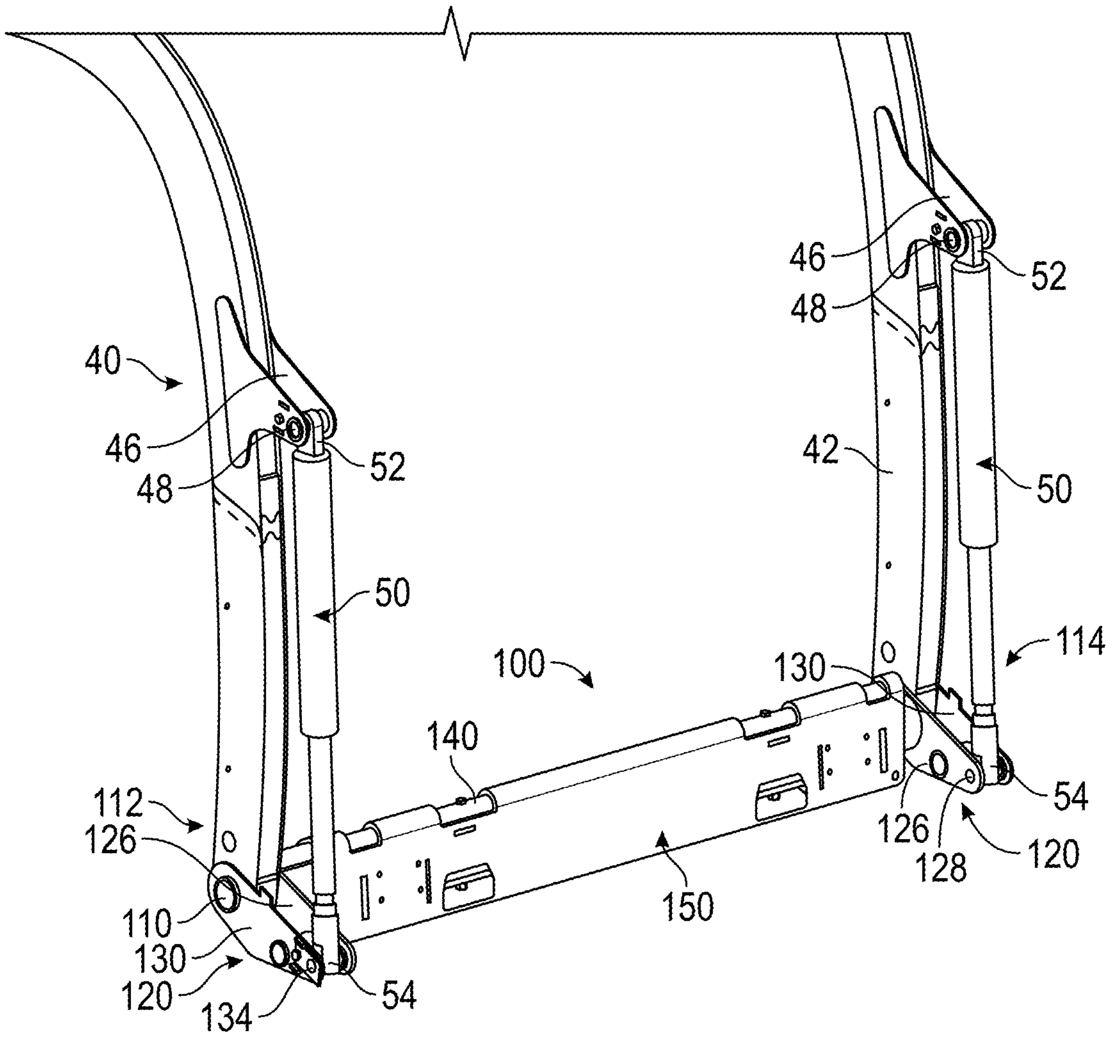
FIG. 2 is a front perspective view of an attachment assembly of a refuse vehicle, according to an exemplary embodiment.

As shown in FIG. 1, the lift arms 42 are rotated by the lift arm actuators 44 to lift the container attachment 200 or other attachment over the cab 16. As shown in FIGS. 1 and 2, the lift assembly 40 includes second actuators, shown as articulation actuators 50 (e.g., hydraulic cylinders, etc.). According to an exemplary embodiment, the articulation actuators 50 are positioned to articulate the attachment assembly 100. Such articulation may assist in tipping refuse out of the container attachment 200 and/or a refuse container (e.g., coupled to the lift assembly 40 by the fork attachment 300, etc.) and into the hopper volume of the refuse compartment 30 through an opening in the cover 36. The lift arm actuators 44 may thereafter rotate the lift arms 42 to return the empty container attachment 200 to the ground. According to an exemplary embodiment, a door, shown as top door 38 is movably coupled along the cover 36 to seal the opening thereby preventing refuse from escaping the refuse compartment 30 (e.g., due to wind, bumps in the road, etc.).

As shown in FIGS. 2-7, the attachment assembly 100 includes a first lateral member, shown as main tube 110, having a first end, shown as right end 112, and an opposing second end, shown as left end 114. As shown in FIGS. 2-5 and 7, the attachment assembly 100 includes a pair of brackets, shown as brackets 120. A first bracket 120 is coupled to the right end 112 of the main tube 110 and a second bracket 120 is coupled to the left end 114 of the main tube 110.

Figure 3:
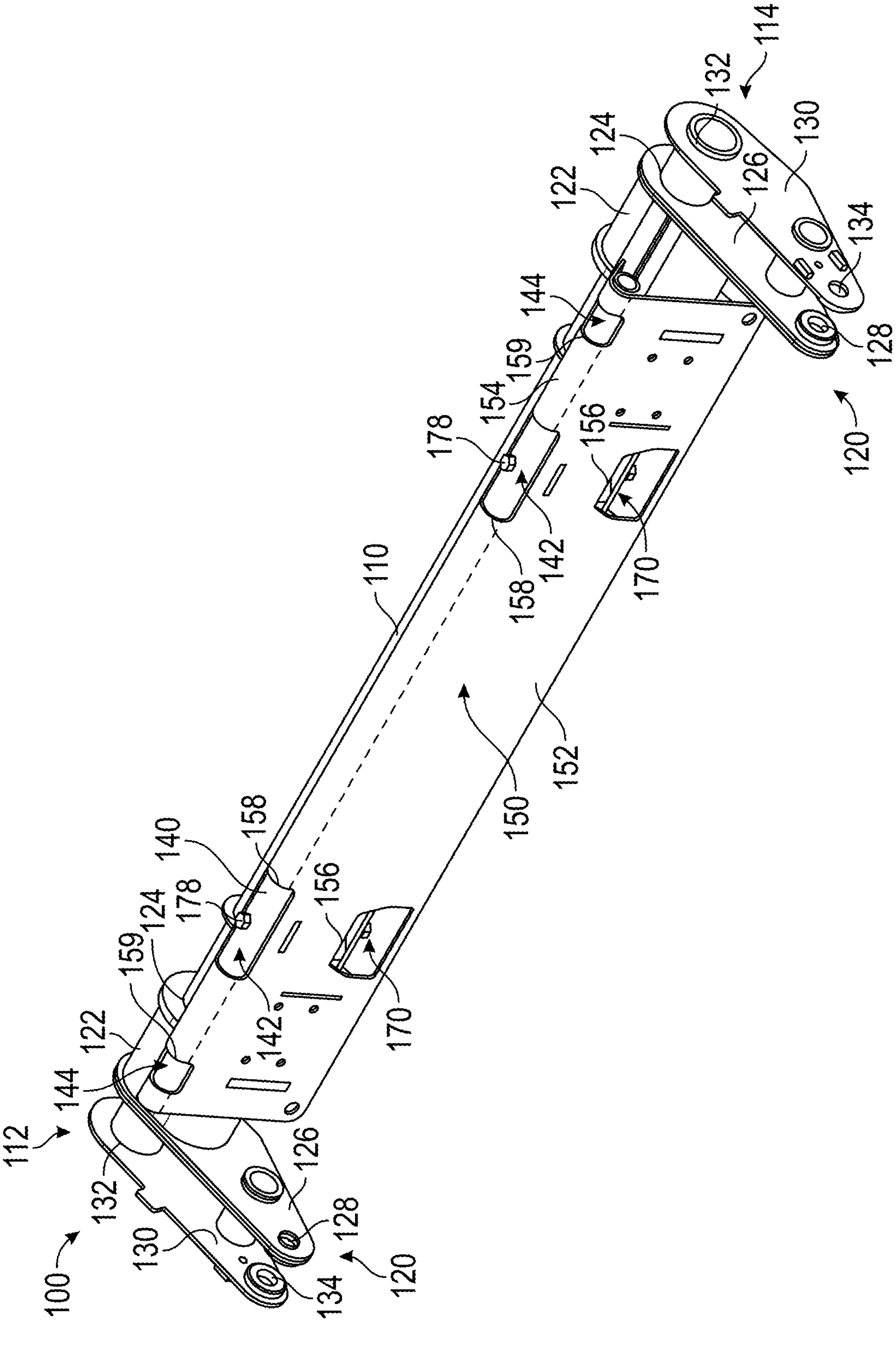
FIG. 3 is a front perspective view of an attachment assembly, according to an exemplary embodiment.
Figure 4:
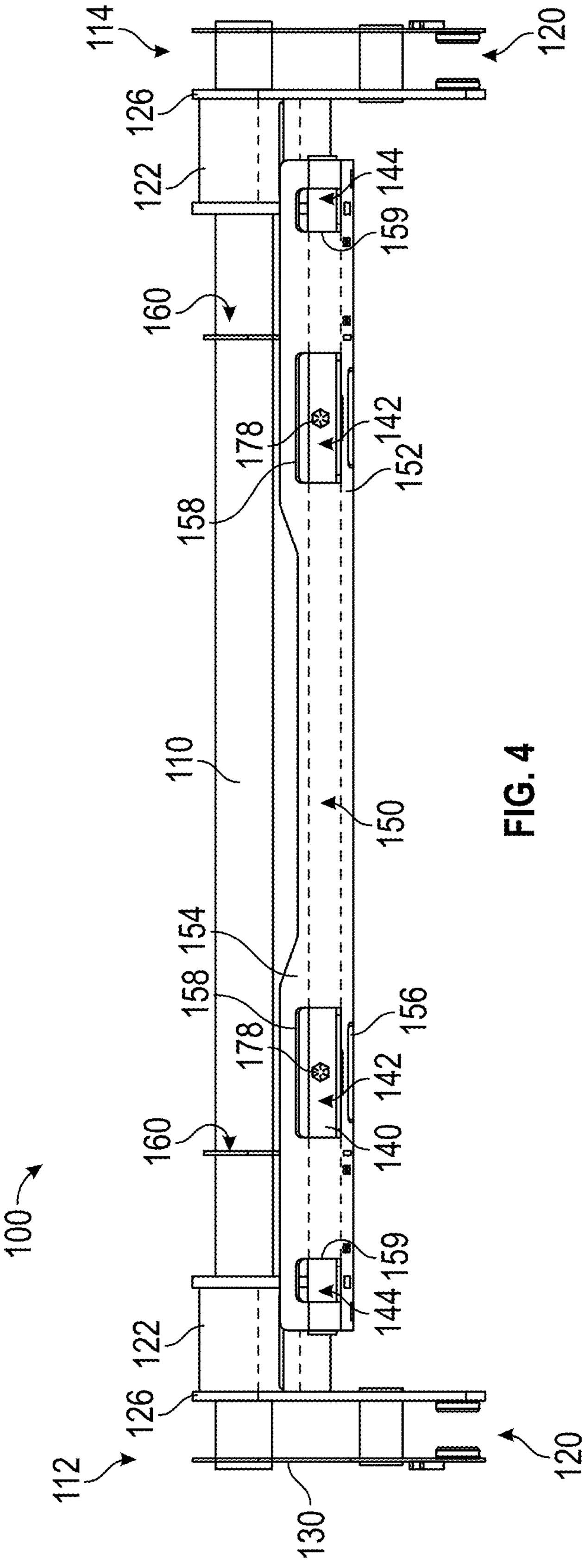
FIG. 4 is a top view of the attachment assembly of FIG. 3, according to an exemplary embodiment.

As shown in FIGS. 2-5 and 7, each of the brackets 120 includes an interface, shown as collar 122; a first plate, shown as inner plate 126, coupled to the collar 122 (e.g., welded thereto, integrally formed therewith, etc.); and a second plate, shown as outer plate 130, spaced from the inner plate 126. As shown in FIG. 3, each of the collars 122 and the inner plates 126 cooperatively define an aperture, shown as through-hole 124. According to an exemplary embodiment, the through-holes 124 of the brackets 120 facilitate sliding the collars 122 onto the main tube 110. The collars 122 may be fixedly secured (e.g., with adhesive, welded, an interface fit, threaded, etc.) onto each of the right end 112 and the left end 114 of the main tube 110. As shown in FIG. 3, each of the outer plates 130 defines an aperture, shown as aperture 132. According to an exemplary embodiment, the apertures 132 facilitate sliding the outer plates 130 onto the main tube 110. The outer plates 130 may be fixedly secured (e.g., with adhesive, welded, an interface fit, threaded, etc.) onto each of the right end 112 and the left end 114 of the main tube 110, forming a space between the inner plates 126 and the outer plates 130. Such a space may facilitate coupling the attachment assembly 100 to the lift assembly 40. As shown in FIG. 2, the ends of the lift arms 42 are disposed between the inner plates 126 and the outer plates 130. According to an exemplary embodiment, the ends of the lift arms 42 each define an aperture that receives the right end 112 and the left end 114, respectively, of the main tube 110. The outer plates 130 may be coupled to the main tube 110 after the main tube 110 is attached to the lift arms 42, thereby securing the attachment assembly 100 to the lift assembly 40.

As shown in FIGS. 2 and 3, each of the inner plates 126 defines an aperture, shown as aperture 128, and each of the outer plates 130 defines a corresponding aperture, shown as aperture 134. The apertures 128 and the apertures 134 cooperatively define a pair of interfaces, one at each of the brackets 120. As shown in FIG. 2, the lift assembly 40 includes a pair of brackets, shown as articulating brackets 46, disposed along the lift arms 42. Each of the articulating brackets 46 defines an interface, shown as through-hole 48. As shown in FIG. 2, each of the articulation actuators 50 includes a first interface, shown as first eyelet 52, positioned at a first end of the articulation actuators 50. Each of the first eyelets 52 is positioned to align with one of the through-holes 48 of the articulating brackets 46 (e.g., to receive a fastener, pin, etc.). According to an exemplary embodiment, the first eyelets 52 pivotally couple the articulation actuators 50 to the articulating brackets 46. As shown in FIG. 2, each of the articulation actuators 50 includes a second interface, shown as second eyelet 54, positioned at an opposing second end of the articulation actuators 50. Each of the second eyelets 54 is positioned to align with one of the interfaces defined by the apertures 128 and the apertures 134 of the brackets 120 (e.g., to receive a fastener, pin, etc.). According to an exemplary embodiment, the second eyelets 54 pivotally couple the articulation actuators 50 to the brackets 120 of the attachment assembly 100.

Figure 5:
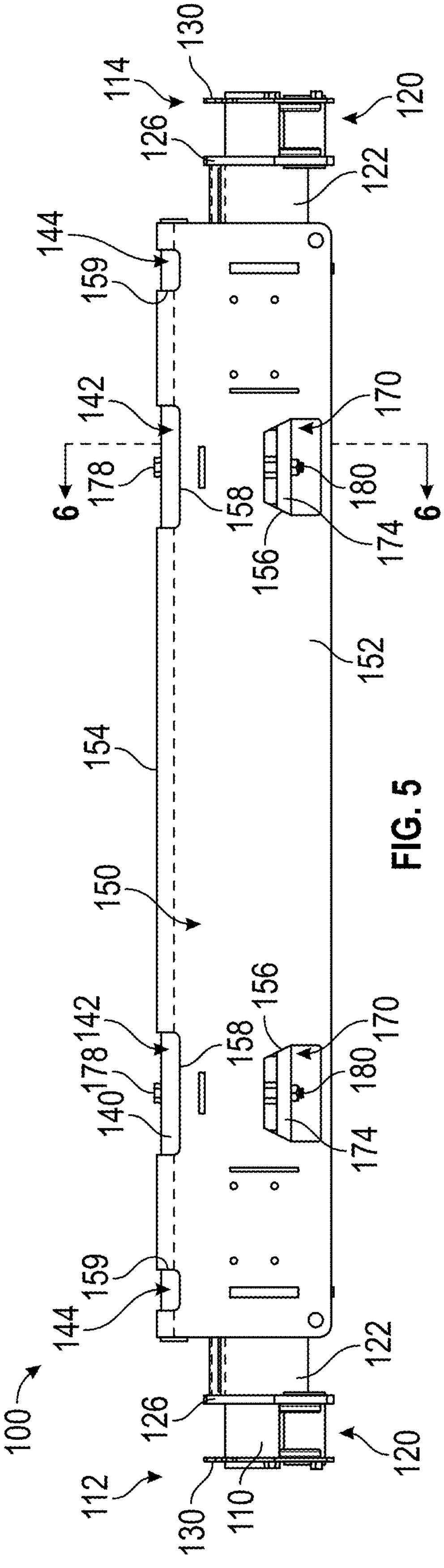
FIG. 5 is a front view of the attachment assembly of FIG. 3, according to an exemplary embodiment.
Figure 6:
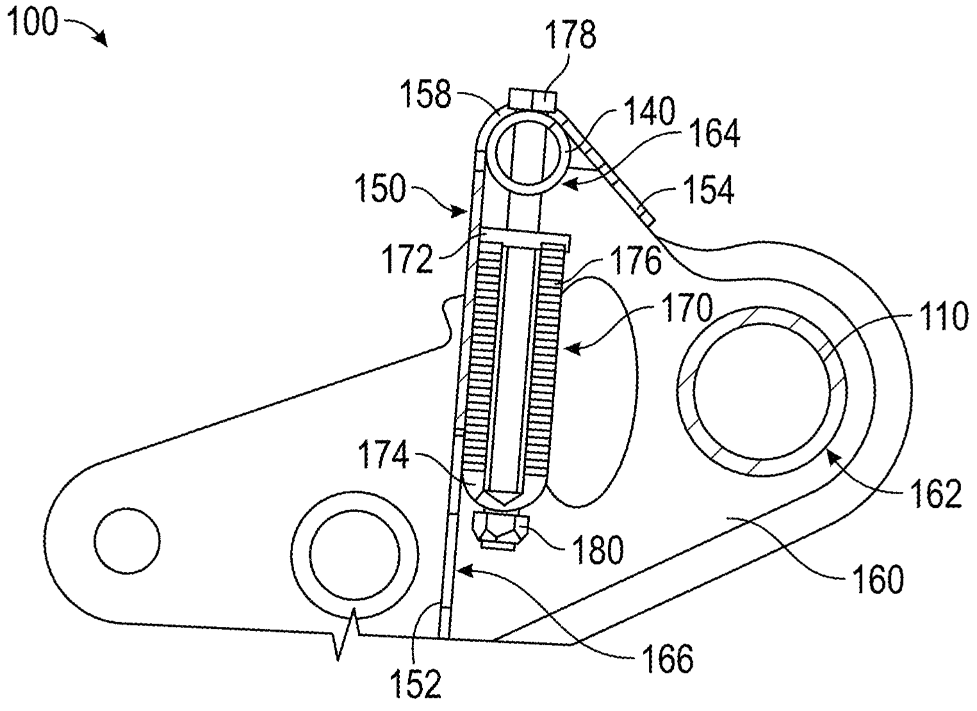
FIG. 6 is a detailed cross-sectional view of the attachment assembly of FIG. 5, according to an exemplary embodiment.

As shown in FIGS. 2-7, the attachment assembly 100 includes a second lateral member, shown as coupling tube 140; a plate, show as attachment plate 150; and a pair of frame members, shown as support plates 160. In other embodiments, the attachment assembly 100 includes a different number of the support plates 160 (e.g., one, three, four, etc.). As shown in FIGS. 3-7, the attachment plate 150 has a plate, shown as plate 152, with a curved portion, shown as flange 154, extending therefrom. As shown in FIGS. 3-7, the flange 154 at least partially curls around and over the coupling tube 140. As shown in FIG. 6, each of the support plates 160 defines an aperture, shown as main aperture 162, positioned to receive the main tube 110. Each of the support plates 160 defines an interface, shown as coupling tube interface 164, configured to engage the coupling tube 140. Each of the support plates 160 includes an edge, shown as front edge 166, positioned along an interior surface of the plate 152 of the attachment plate 150. The support plates 160 may thereby couple the main tube 110, the coupling tube 140, and the attachment plate 150 together. According to an exemplary embodiment, the main tube 110, the coupling tube 140, the attachment plate 150, and/or the support plates 160 form a single weldment. In other embodiments, the components of the attachment assembly 100 are otherwise coupled together (e.g., fastened, adhesively coupled, etc.). In other embodiments, the support plates 160 are differently shaped and/or couple a different combination of components.

As shown in FIGS. 3-7, the plate 152 of the attachment plate 150 defines a first plurality of apertures, shown as first apertures 156. The flange 154 of the attachment plate 150 defines a second plurality of apertures, shown as second apertures 158, positioned to align with the first apertures 156. The second apertures 158 expose first respective portions, shown as first exposed portions 142, of the coupling tube 140. According to the exemplary embodiment shown in FIGS. 3-7, the attachment plate 150 includes two first apertures 156 and two second apertures 158, a first set positioned towards the right end 112 and a second set positioned towards the left end 114. In other embodiments, the attachment plate 150 includes a different number of sets of the first apertures 156 and the second apertures 158 (e.g., one set, three sets, etc.). By way of example, a third set of the first apertures 156 and the second apertures 158 may be positioned in the center of the attachment plate 150 (e.g., centered between the right end 112 and the left end 114, etc.). As shown in FIGS. 3-5 and 7, the flange 154 of the attachment plate 150 defines a third plurality of apertures, shown as third apertures 159. A first of the third apertures 159 is positioned proximate the right end 112 of the attachment plate 150 and a second of the third apertures 159 is positioned proximate the left end 114 of the attachment plate 150 (e.g., the third apertures 159 are positioned further laterally outward than each set of first apertures 156 and second apertures 158, etc.). The third apertures 159 expose second respective portions, shown as second exposed portions 144, of the coupling tube 140.

As shown in FIGS. 3 and 5-7, the attachment assembly 100 includes a plurality of couplers, shown as couplers 170. According to the exemplary embodiment shown in FIGS. 3 and 5-7, the attachment assembly 100 includes a pair of couplers, shown as couplers 170, one positioned to align with each set of the first apertures 156 and the second apertures 158 of the attachment plate 150. In other embodiments, the attachment assembly 100 includes a different number of couplers 170 to correspond with a different number of sets of the first apertures 156 and the second apertures 158 (e.g., one, three, etc.). According to an exemplary embodiment, the couplers 170 are configured to facilitate selectively and releasably securing an attachment (e.g., the container attachment 200, the fork attachment 300, etc.) to the attachment assembly 100.

Figure 7:
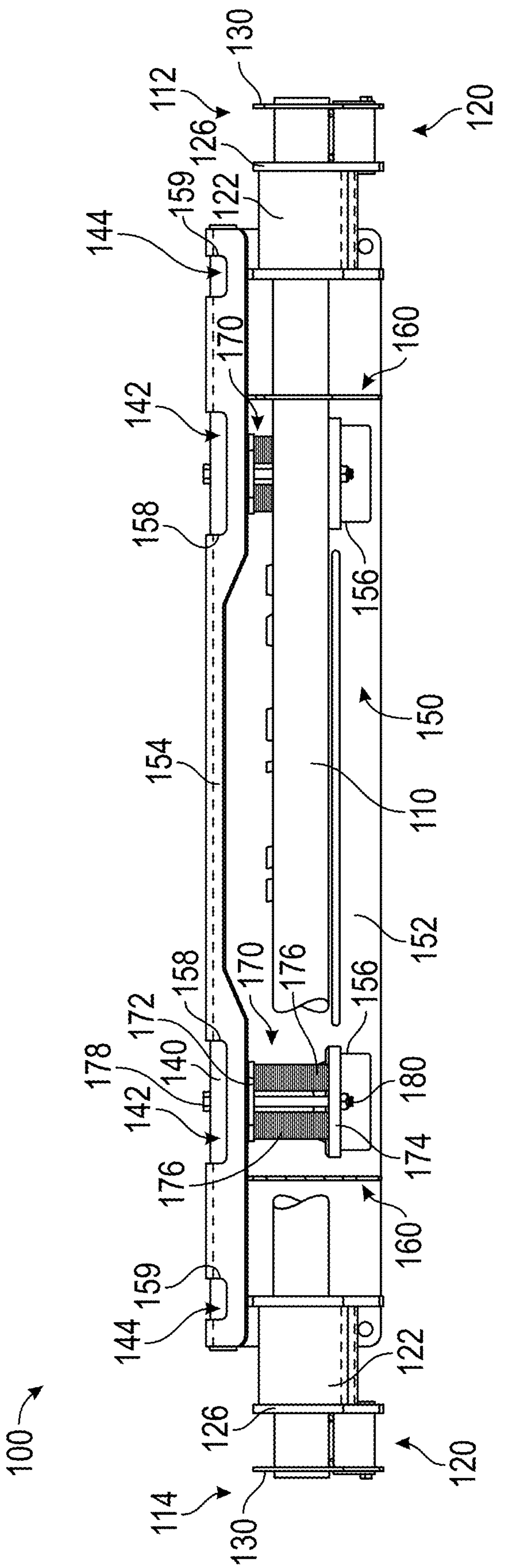
FIG. 7 is a rear view of the attachment assembly of FIG. 3, according to an exemplary embodiment.

As shown in FIGS. 6 and 7, each of the couplers 170 includes a first support (e.g., a plate, etc.), shown as upper support 172. As shown in FIG. 6, the upper supports 172 are coupled (e.g., attached, fixed, fastened, welded, adhesively secured, etc.) to the interior surface of the plate 152 (e.g., indirectly coupled to the coupling tube 140, above the first apertures 156 and below the second apertures 158, etc.). In alternative embodiments, the upper supports 172 are directly coupled (e.g., attached, fixed, fastened, welded, adhesively secured, etc.) to an underside of the coupling tube 140.

As shown in FIGS. 5-7, each of the couplers 170 incudes a second support (e.g., a plate, a bar, a half-moon or semi-circular shaped bar/tube, etc.), shown as lower support 174. As shown in FIGS. 6 and 7, the lower supports 174 are selectively spaced from (e.g., offset relative to, etc.) the upper supports 172, thereby defining a gap therebetween. The top surface of the lower supports 174 are flat and an underside of the lower supports 174 are curved (e.g., half-moon shaped, etc.), according to an exemplary embodiment. As shown in FIGS. 6 and 7, each of the couplers 170 includes a plurality of resilient members, shown as springs 176, disposed within the gap between a bottom surface of the upper supports 172 and the top surface of the lower supports 174. According to an exemplary embodiment, each of the couplers 170 includes a pair of springs 176. In other embodiments, each of the couplers 170 includes a different number of the springs 176 (e.g., one, three, four, etc.). According to an exemplary embodiment, the springs 176 are configured to provide a resilient force to bias the lower supports 174 away from the upper supports 172.

As shown in FIGS. 3-7, each of the couplers 170 includes an adjuster assembly having an adjuster, shown as fastener 178, and a retainer, shown as nut 180. As shown in FIGS. 3-7, the fasteners 178 are accessible through the second apertures 158. As shown in FIG. 6, each of the fasteners 178 extends through the coupling tube 140, the upper supports 172, and the lower supports 174 and engages a respective nut 180 positioned along the underside of a respective lower support 174. In one embodiment, the nuts 180 are free to rotate. In another embodiment, the nuts 180 are fixed (e.g., welded, etc.) to the lower supports 174. In alternative embodiments, the adjuster assemblies do not include the nuts 180. By way of example, the lower supports 174 may define a threaded aperture that threadably engages the fasteners 178. According to an exemplary embodiment, the adjuster assemblies (e.g., the fasteners 178, the nuts 180, etc.) are configured to facilitate selectively reorienting the lower supports 174 relative to the upper supports 172 between a first position (e.g., an extended position, an engagement position, etc.) and a second position (e.g., a compressed position, a disengagement position, etc.). By way of example, adjusting (e.g., tightening, loosening, etc.) the fasteners 178 may bring the lower supports 174 upward, towards the upper supports 172, compressing the springs 176. By way of another example, adjusting (e.g., loosening, tightening, etc.) the fasteners 178 may dismiss the lower supports 174 downward, away from the upper supports 172, relaxing the springs 176.

Figure 9:
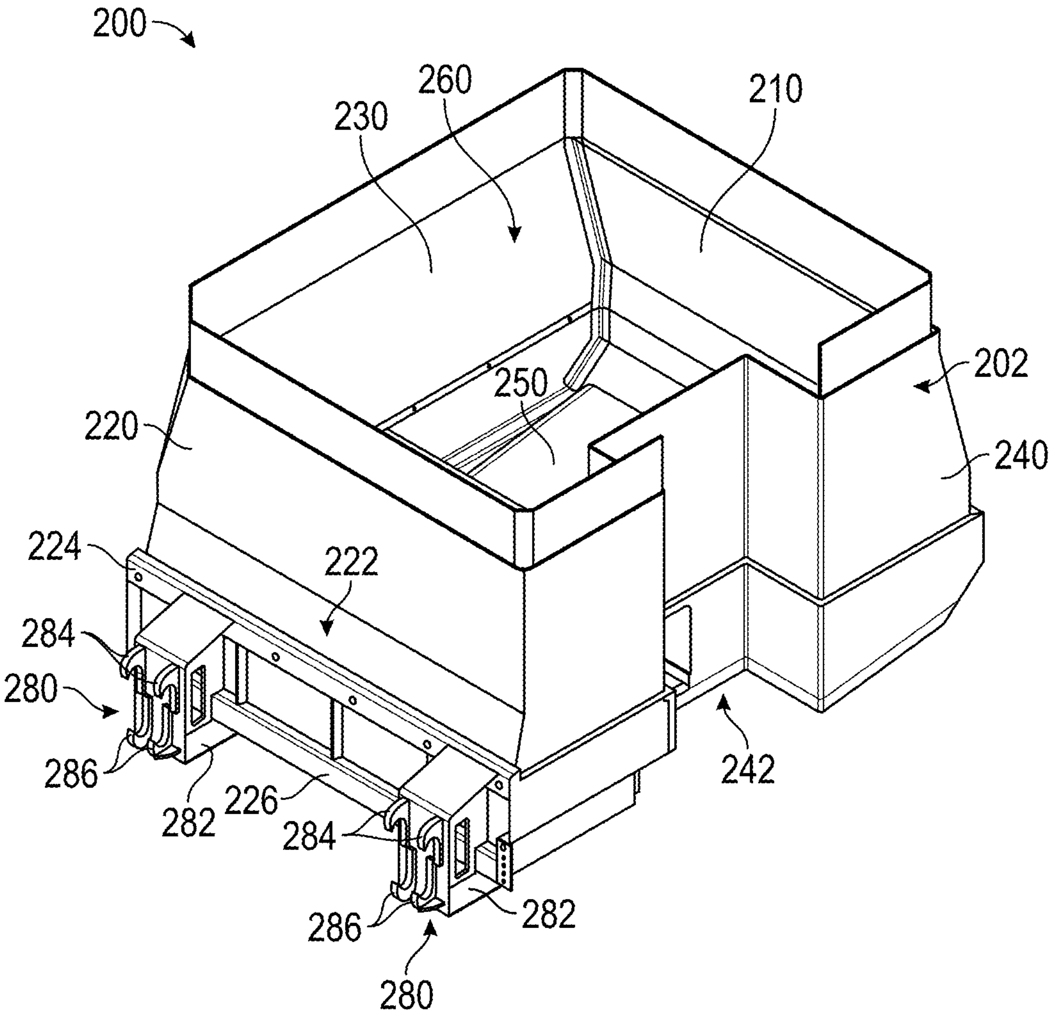
FIG. 9 is a rear perspective view of the first attachment of FIG. 8, according to an exemplary embodiment.
Figure 10:
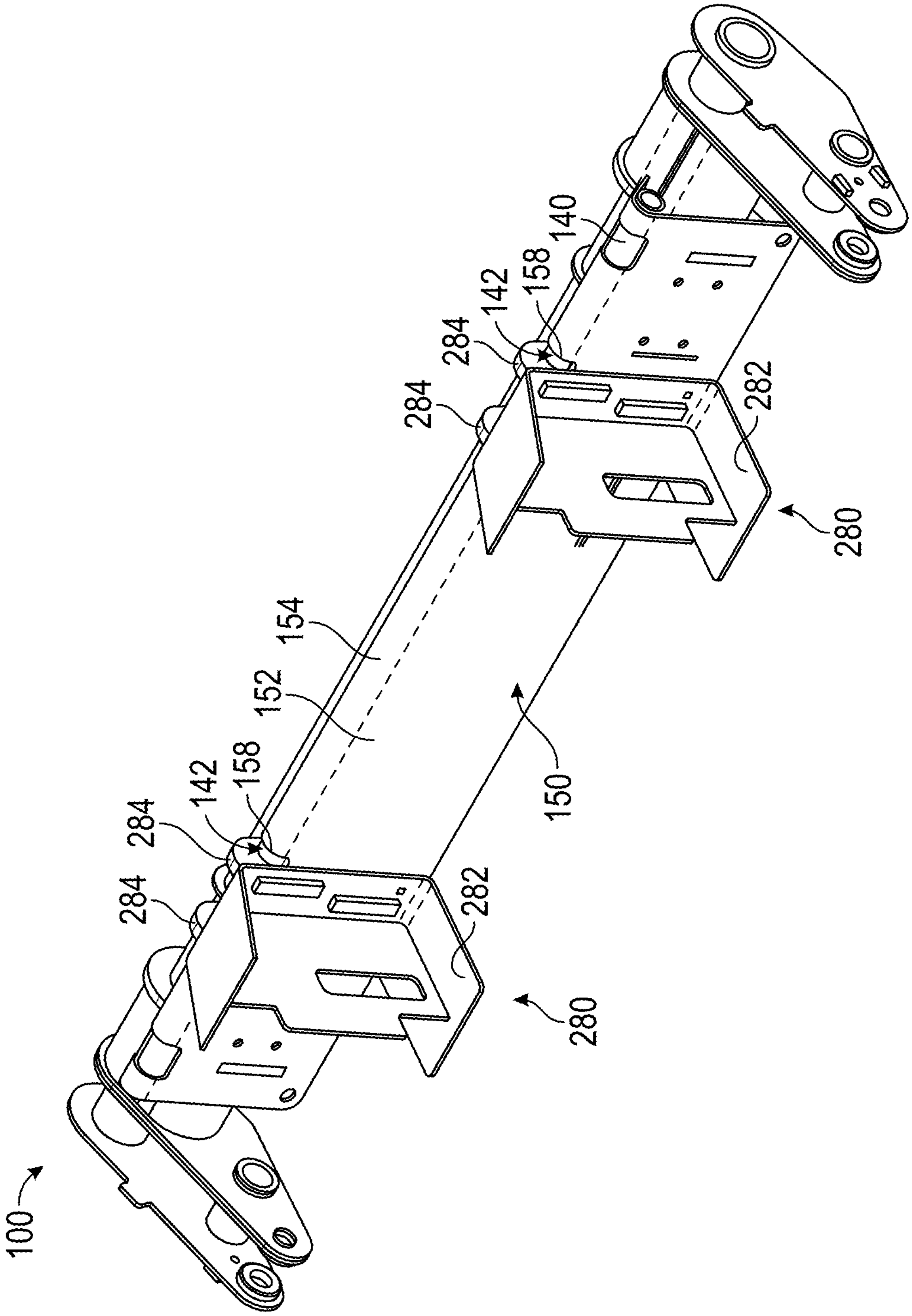
FIGS. 10-15 are various views of an interface of the first attachment of FIG. 8 coupled to the attachment assembly of FIG. 3, according to an exemplary embodiment.

As shown in FIGS. 8 and 9, the container attachment 200 includes a container, shown as refuse container 202; an articulating refuse collection arm, shown as collection arm assembly 270; and an interface, shown as attachment interface 280. The refuse container 202 has a first wall, shown as front wall 210; an opposing second wall, shown as rear wall 220 (e.g., positioned between the cab 16 and the front wall 210, etc.); a first sidewall, shown as first sidewall 230; an opposing second sidewall, shown as second sidewall 240; and a bottom surface, shown as bottom 250. The front wall 210, the rear wall 220, the first sidewall 230, the second sidewall 240, and the bottom 250 cooperatively define an internal cavity, shown as container refuse compartment 260. According to an exemplary embodiment, the container refuse compartment 260 is configured to receive refuse from a refuse container (e.g., a residential garbage can, a recycling bin, etc.).

As shown in FIGS. 8 and 9, the second sidewall 240 of the refuse container 202 defines a cavity, shown as recess 242. As shown in FIG. 8, the collection arm assembly 270 is coupled to the refuse container 202 and may be positioned within the recess 242. In other embodiments, the collection arm assembly 270 is otherwise positioned (e.g., coupled to the rear wall 220, coupled to the first sidewall 230, coupled to the front wall 210, etc.). According to an exemplary embodiment, the collection arm assembly 270 includes an arm, shown as arm 272; a grabber assembly, shown as grabber 276, coupled to an end of the arm 272; and an actuator, shown as actuator 274. The actuator 274 may be positioned to selectively reorient the arm 272 such that the grabber 276 is extended laterally outward from and retracted laterally inward toward the refuse container 202 to engage (e.g., pick up, etc.) a refuse container (e.g., a garbage can, a reclining bin, etc.) for emptying refuse into the container refuse compartment 260.

As shown in FIG. 9, the container attachment 200 includes a frame member, shown as attachment frame 222, disposed along (e.g., attached to, coupled to, fastened to, welded to, etc.) the rear wall 220 of the refuse container 202. The attachment frame 222 includes a first frame member, shown as upper frame member 224, and a second frame member, shown as lower frame member 226, extending along the rear wall 220. As shown in FIG. 9, the attachment frame 222 is configured to facilitate coupling the attachment interface 280 to the rear wall 220 of the refuse container 202. In other embodiments, the container attachment 200 does not include the attachment frame 222. By way of example, the attachment interface 280 may be directly coupled (e.g., fastened, welded, etc.) to the rear wall 220 of the refuse container 202.

As shown in FIGS. 9-15, the attachment interface 280 includes a plurality of brackets, shown as attachment brackets 282. According to the exemplary embodiment shown in FIGS. 9-15, the attachment interface 280 includes a pair of attachment brackets 282, one positioned to align with (i) each set of the first apertures 156 and the second apertures 158 of the attachment plate 150 and (ii) each coupler 170. In other embodiments, the attachment interface 280 includes a different number of attachment brackets 282 to correspond with a different number of (i) sets of the first apertures 156 and the second apertures 158 and (ii) the couplers 170 (e.g., one, three, etc.). As shown in FIG. 9, the attachment brackets 282 are coupled (e.g., fastened, welded, etc.) to the rear wall 220 of the refuse container 202 (e.g., directly, indirectly by the attachment frame 222, etc.).

In one embodiment, the attachment interface 280 includes a connector. The connector may include a first pair of connectors and a second pair of connectors. As shown in FIGS. 9-12, 14, and 15, each of the attachment brackets 282 includes the first pair of connectors, shown as upper hooks 284, and the second pair of connectors, shown as lower hooks 286, extending therefrom. In other embodiments, the attachment brackets 282 include a different number of upper hooks 284 (e.g., one, three, etc.) and/or a different number of lower hooks 286 (e.g., one, three, etc.). In an alternative embodiment, the attachment interface 280 does not include the attachment brackets 282. By way of example, the upper hooks 284 and the lower hooks 286 may directly couple to and extend from the rear wall 220 of the refuse container 202. In other embodiments, the attachment interface 280 includes one upper hook 284 and/or one lower hook 286 on each of the attachment brackets 282.

Figure 11:
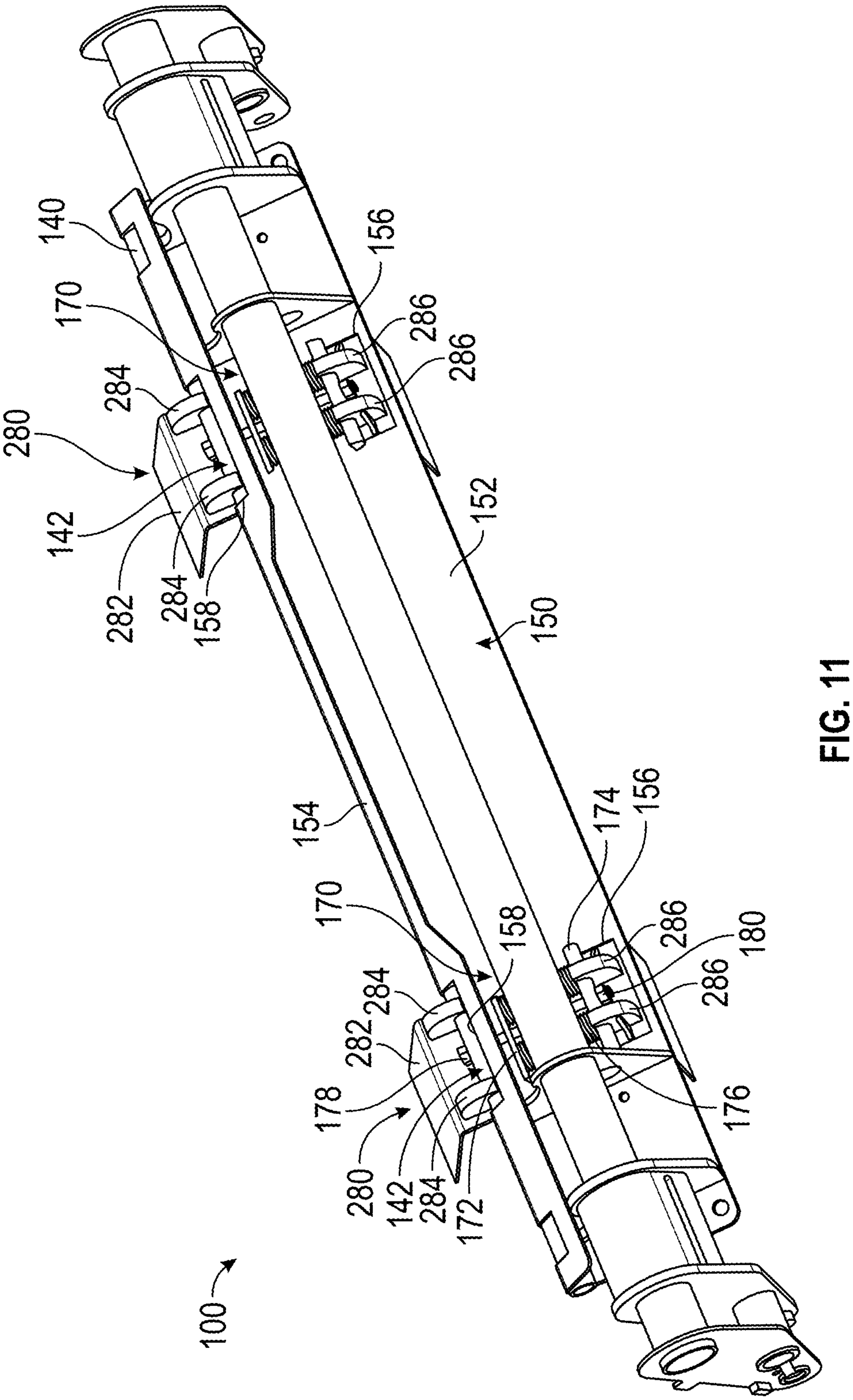
Figure 12:
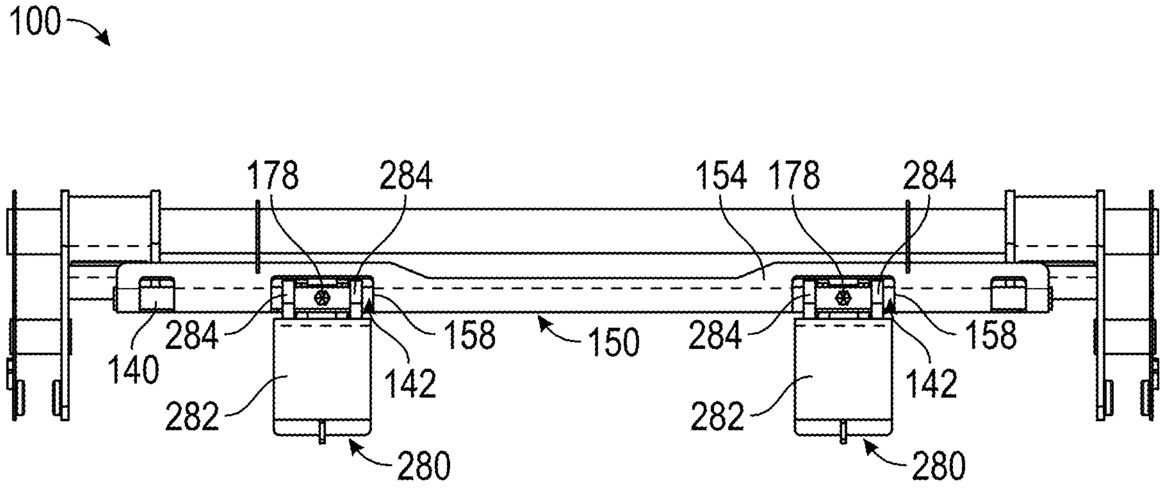
Figure 13:
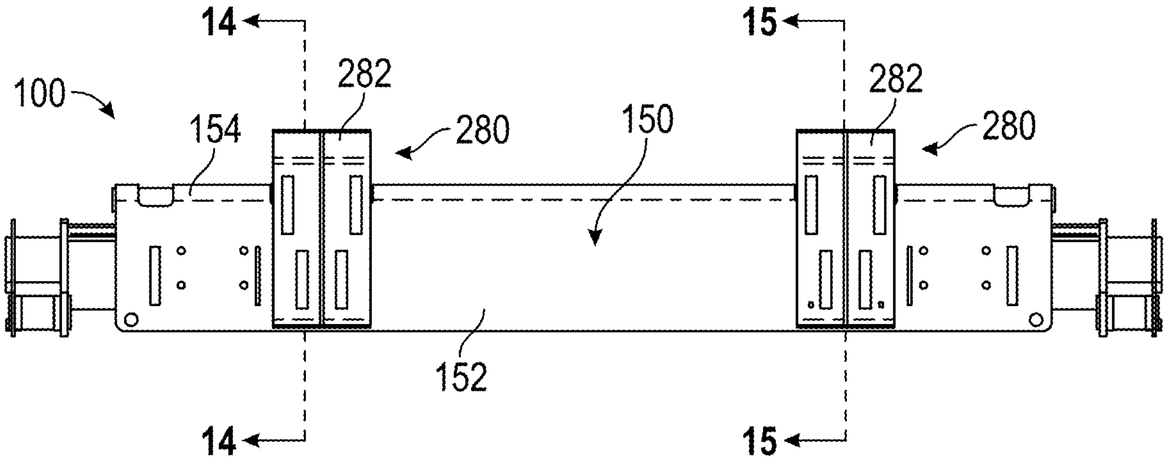
Figure 14:
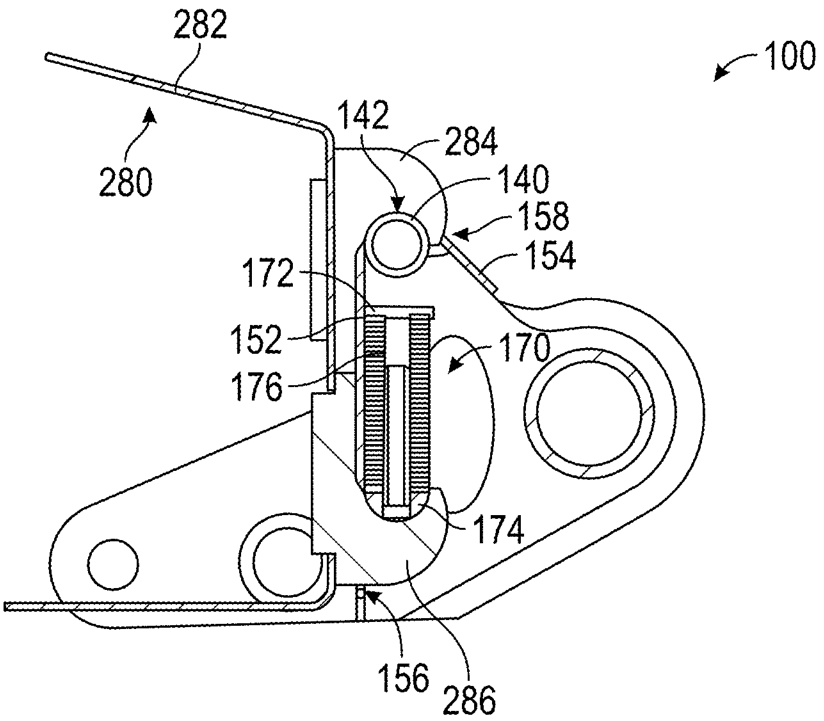
Figure 15:
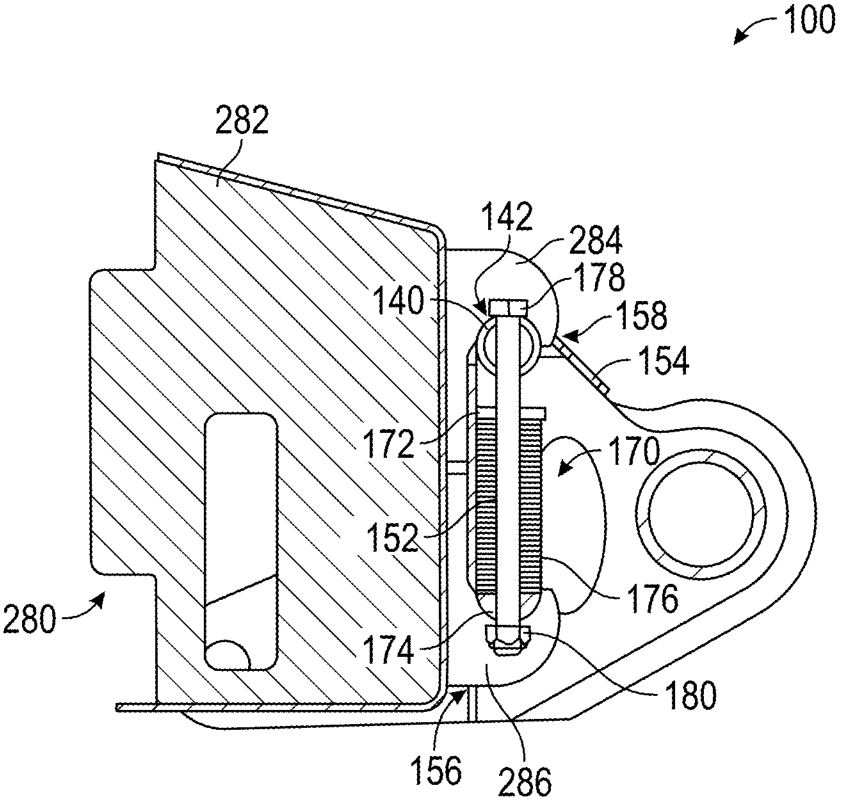

As shown in FIGS. 10-12, 14, and 15, the upper hooks 284 are configured to extend through and be received by the second apertures 158 such that the upper hooks 284 engage the first exposed portions 142 of the coupling tube 140. In other embodiments, the upper hooks 284 engage the flange 154 (e.g., the flange 154 may not define the second apertures 158, etc.). As shown in FIGS. 11, 14, and 15, the lower hooks 286 are configured to extend through and be received by the first apertures 156 such that the lower hooks 286 engage the underside of the lower supports 174. According to an exemplary embodiment, the lower supports 174 are configured to engage the lower hooks 286 when selectively reoriented into the first position (e.g., the extended position, the engagement position, etc.) and disengage from the lower hooks 286 when selectively reoriented into the second position (e.g., the compressed position, the disengagement position, etc.).

In operation, the container attachment 200 may be coupled to the attachment assembly 100 using the following method. First, the fasteners 178 of the couplers 170 may be adjusted (e.g., tightened, etc.) to draw the lower supports 174 upward into the second position (e.g., the compressed position, the disengagement position, etc.). Second, the container attachment 200 may be interfaced with the attachment assembly 100 such that the upper hooks 284 extend through the second apertures 158 of the attachment plate 150 and engage the first exposed portions 142 of the coupling tube 140. The lower hooks 286 may extend freely through the first apertures 156 of the attachment plate 150. Third, the fasteners 178 of the couplers 170 may be adjusted (e.g., loosened, etc.) to relax the springs 176 and dismiss the lower supports 174 to the first position (e.g., the extended position, the engagement position, etc.) such that the lower supports 174 engage the lower hooks 286. Such engagement between (i) the upper hooks 284 with the coupling tube 140 and (ii) the lower hooks 286 and the lower supports 174 may selectively secure the container attachment 200 to the attachment assembly 100. Such attachment may facilitate the refuse vehicle 10 in carrying the container attachment 200 (e.g., such that the lift assembly 40 may lift the container attachment 200 to empty refuse within the container refuse compartment 260 of the refuse container 202 into the refuse compartment 30 of the refuse vehicle 10, etc.).

As shown in FIGS. 16-20, the fork attachment 300 includes a plate, shown as fork plate 310; a pair of forks, shown as forks 320, extending from the fork plate 310; and an interface, shown as attachment interface 330. According to an exemplary embodiment, the forks 320 are coupled (e.g., attached, fastened, welded, etc.) to the fork plate 310. The forks 320 may have a generally rectangular cross-sectional shape and are configured to engage a refuse container (e.g., protrude through fork pockets of a commercial refuse container, a carry can, a container assembly with a robotic arm, etc.). During operation of the refuse vehicle 10, the forks 320 are positioned to engage the refuse container (e.g., the refuse vehicle 10 is driven into position such that the forks 320 protrude through fork pockets within the refuse container, etc.). As shown in FIGS. 17-20, each of the forks 320 includes a connector, shown as fork hook 322.

Figure 18:
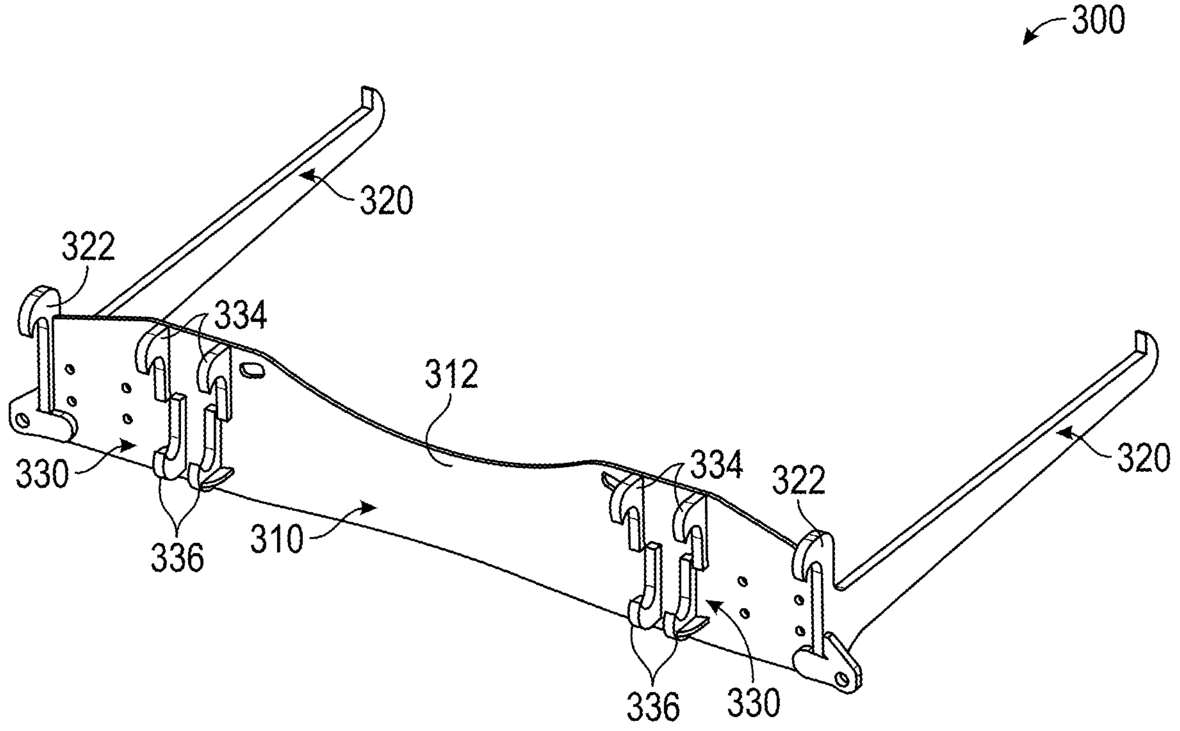
Figure 19:
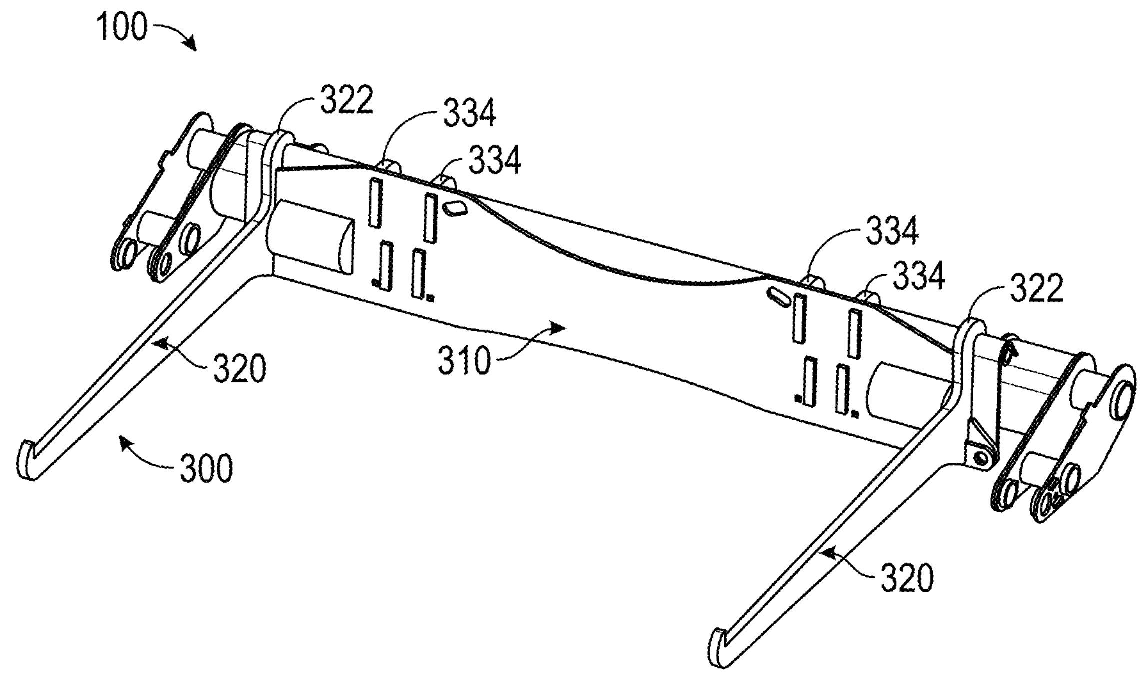
FIGS. 19 and 20 are various perspective views of an interface of the second attachment of FIG. 16 coupled to the attachment assembly of FIG. 3, according to an exemplary embodiment.

As shown in FIG. 18, the attachment interface 330 is directly coupled (e.g., fastened, welded, etc.) to a rear surface, shown as rear face 312, of the fork plate 310. In one embodiment, the attachment interface 330 includes a connector. The connector may include a first plurality of connectors and a second plurality of connectors. As shown in FIGS. 17-20, the fork plate 310 includes the first plurality of connectors, shown as upper hooks 334, and the second plurality of connectors, shown as lower hooks 336, extending therefrom. According to the exemplary embodiment shown in FIGS. 17-20, the attachment interface 330 includes two sets of upper hooks 334 and two sets of lower hooks 336, one set of each positioned to align with (i) each set of the first apertures 156 and the second apertures 158 of the attachment plate 150 and (ii) each coupler 170. In other embodiments, the attachment interface 330 includes a different number of sets of the upper hooks 334 and sets of lower hooks 336 to correspond with a different number of (i) sets of the first apertures 156 and the second apertures 158 and (ii) the couplers 170 (e.g., one, three, etc.). According to the exemplary embodiment shown in FIGS. 17-20, each set of upper hooks 334 and lower hooks 336 includes two hooks. In other embodiments, each set of upper hooks 334 and/or lower hooks 336 includes a different number of hooks (e.g., one, three, etc.). In an alternative embodiment, the attachment interface 330 includes attachment brackets (e.g., similar to the attachment brackets 282 of the attachment interface 280, etc.).

Figure 20:
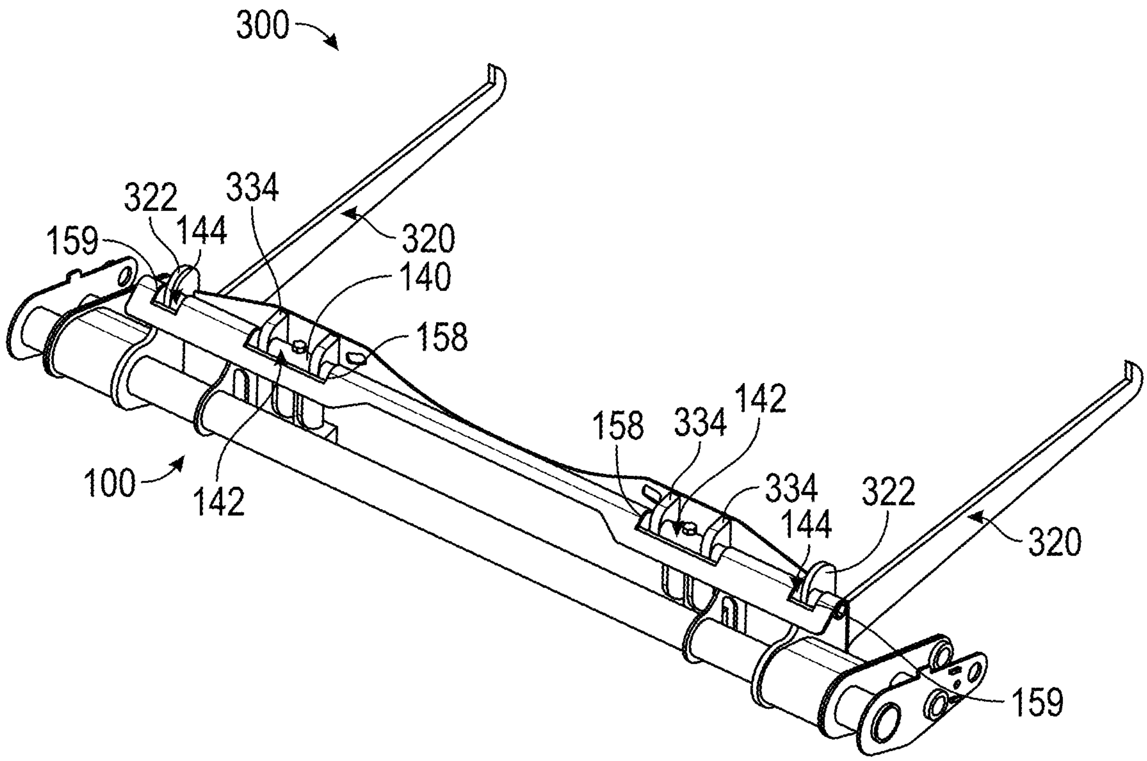

As shown in FIG. 20, the upper hooks 334 are configured to extend through and be received by the second apertures 158 such that the upper hooks 334 engage the first exposed portions 142 of the coupling tube 140. In other embodiments, the upper hooks 334 engage the flange 154 (e.g., the flange 154 may not define the second apertures 158, etc.). According to an exemplary embodiment, the lower hooks 336 are configured to extend through and be received by the first apertures 156 such that the lower hooks 336 engage the underside of the lower supports 174 (e.g., similar to the lower hooks 286 of the attachment interface 280, etc.). The lower supports 174 are configured to engage the lower hooks 336 when selectively reoriented into the first position (e.g., the extended position, the engagement position, etc.) and disengage from the lower hooks 336 when selectively reoriented into the second position (e.g., the compressed position, the disengagement position, etc.). As shown in FIG. 20, the fork hooks 322 are configured to extend through and be received by the third apertures 159 such that the fork hooks 322 engage the second exposed portions 144 of the coupling tube 140. In other embodiments, the fork hooks 322 engage the flange 154 (e.g., the flange 154 may not define the third apertures 159, etc.).

In operation, the fork attachment 300 may be coupled to the attachment assembly 100 using the following method. First, the fasteners 178 of the couplers 170 may be adjusted (e.g., tightened, etc.) to draw the lower supports 174 upward into the second position (e.g., the compressed position, the disengagement position, etc.). Second, the fork attachment 300 may be interfaced with the attachment assembly 100 such that (i) the upper hooks 334 extend through the second apertures 158 of the attachment plate 150 and engage the first exposed portions 142 of the coupling tube 140 and (ii) the fork hooks 322 extend through the third apertures 159 of the attachment plate 150 and engage the second exposed portions 144 of the coupling tube 140. The lower hooks 336 may extend freely through the first apertures 156 of the attachment plate 150. Third, the fasteners 178 of the couplers 170 may be adjusted (e.g., loosened, etc.) to relax the springs 176 and dismiss the lower supports 174 to the first position (e.g., the extended position, the engagement position, etc.) such that the lower supports 174 engage the lower hooks 336. Such engagement between (i) the upper hooks 334 and/or the fork hooks 322 with the coupling tube 140 and (ii) the lower hooks 336 and the lower supports 174 may selectively secure the fork attachment 300 to the attachment assembly 100. Such attachment may facilitate the refuse vehicle 10 carrying the fork attachment 300 (e.g., such that the lift assembly 40 may interface with and lift a refuse container; the forks 320 protrude through fork pockets of a commercial refuse container, a carry can, a container assembly with a robotic arm; to empty refuse within a refuse container into the refuse compartment 30 of the refuse vehicle 10; etc.).

Figure 21:
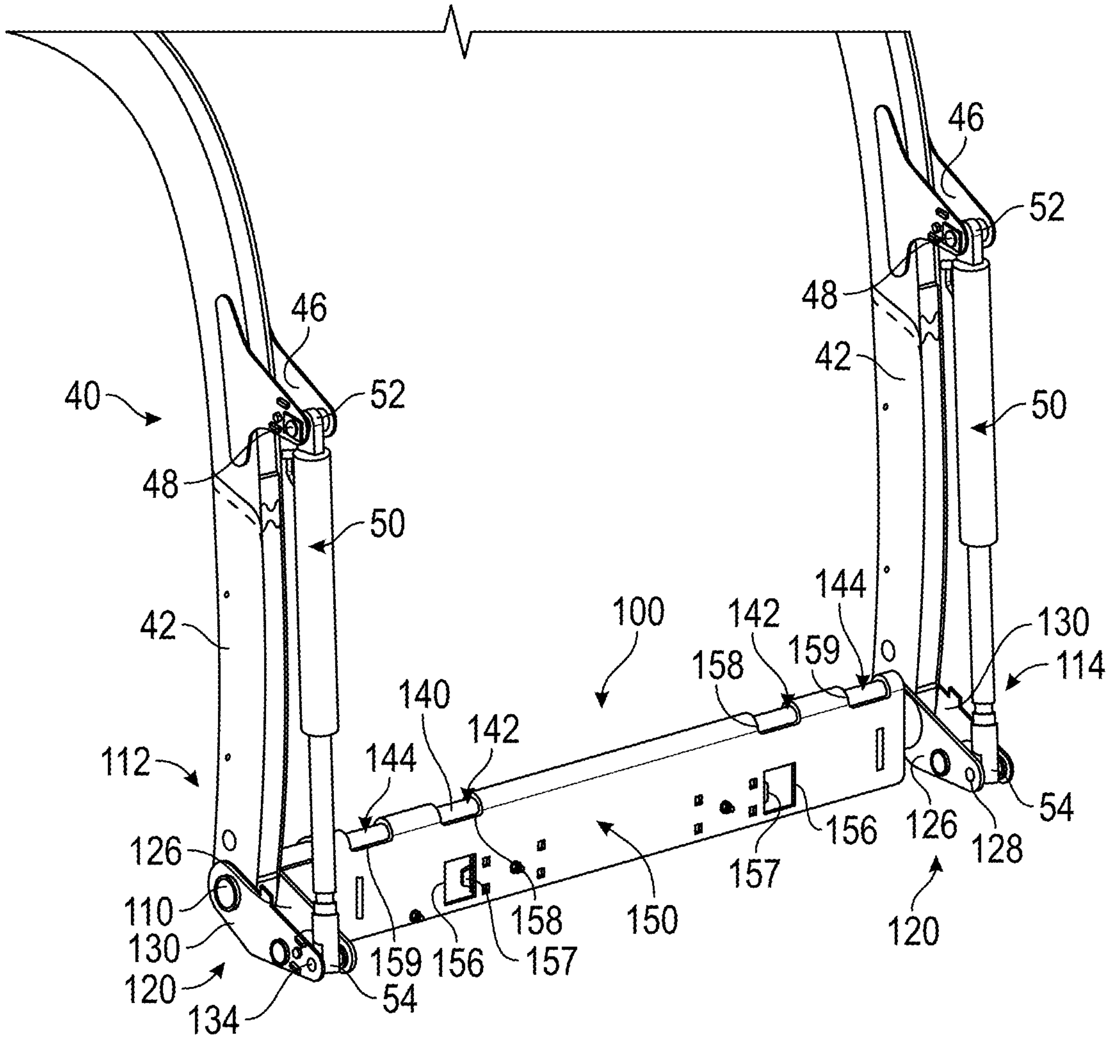
FIG. 21 is a front perspective view of an attachment assembly of a refuse vehicle, according to another exemplary embodiment.

According to the exemplary embodiment shown in FIG. 21, the attachment assembly 100 includes an alternative coupler. As shown in FIG. 21, the attachment assembly 100 includes a locking mechanism, shown as movable retainers 157 (e.g., a movable tab, a movable bar, a movable pin, etc.), coupled to the interior surface of the plate 152 of the attachment plate 150. The movable retainers 157 are positioned to selectively extend across the first apertures 156 of the plate 152 of the attachment plate 150 between a first position (e.g., a retracted position, an unlocked position, etc.) and a second position (e.g., an extended position, a locked position, etc.). According to an exemplary embodiment, the movable retainers 157 are configured to selectively engage with pockets of the container attachment 200, the fork attachment 300, etc. to couple (e.g., attach, secure, etc.) the respective attachment to the refuse vehicle 10.

Figure 22:
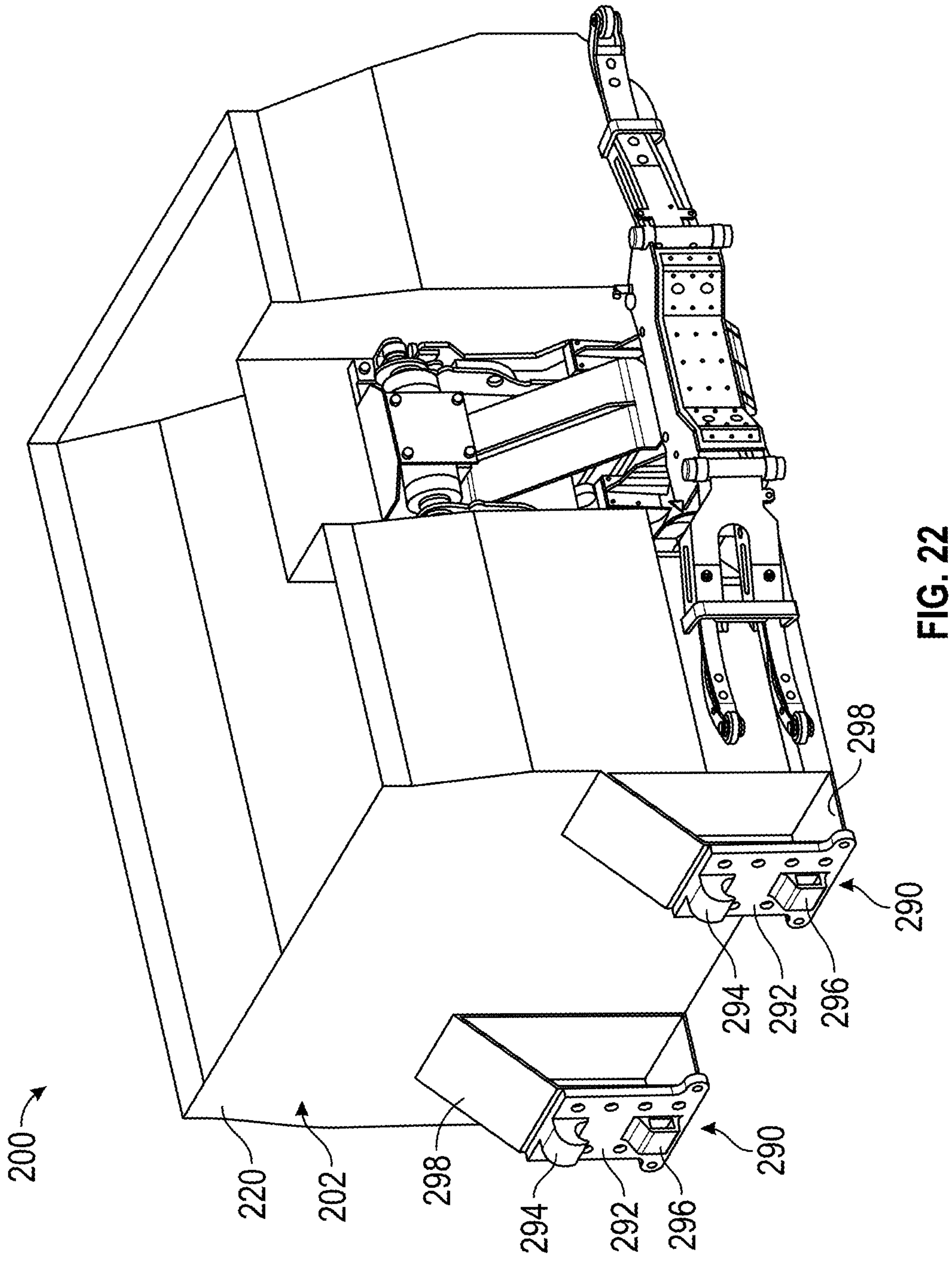
FIG. 22 is a rear perspective view of the first attachment of FIG. 8, according to another exemplary embodiment.

According to the exemplary embodiment shown in FIG. 22, the container attachment 200 includes an alternative interface, shown as attachment interface 290. As shown in FIG. 22, the attachment interface 290 includes a plurality of brackets, shown as attachment brackets 298. According to the exemplary embodiment shown in FIG. 22, the attachment interface 290 includes a pair of attachment brackets 298, one positioned to align with each set of the first apertures 156 and the second apertures 158 of the attachment plate 150 and (ii) each movable retainer 157. In other embodiments, the attachment interface 290 includes a different number of attachment brackets 298 to correspond with a different number of (i) sets of the first apertures 156 and the second apertures 158 and (ii) the movable retainers 157 (e.g., one, three, etc.). As shown in FIG. 22, the attachment brackets 298 are coupled (e.g., fastened, welded, etc.) to the rear wall 220 of the refuse container 202.

As shown in FIG. 22, the attachment interface 290 includes a pair of plates, shown as plates 292. One of the plates 292 is coupled (e.g., attached, fastened, welded, etc.) to each of the attachment brackets 298. In other embodiments, the attachment interface 290 includes a different number of plates 292 (e.g., one, three, etc.) to correspond with the number of attachment brackets 298. In an alternative embodiment, the attachment interface 290 does not include the attachment brackets 298. By way of example, the plates 292 may be directly coupled to the rear wall 220 of the refuse container 202. As shown in FIG. 22, each of the plates 292 includes a first connector, shown as upper hook 294, and a second connector, shown as lower pocket 296, extending therefrom. In other embodiments, the plates 292 include a different number of upper hooks 294 (e.g., two, three, etc.). According to an exemplary embodiment, the upper hooks 294 are configured to extend through and be received by the second apertures 158 such that the upper hooks 294 engage the first exposed portions 142 of the coupling tube 140. According to an exemplary embodiment, the lower pockets 296 are configured to extend through and be received by the first apertures 156. The lower pockets 296 are configured to receive the movable retainers 157 to secure the container attachment 200 to the attachment assembly 100, according to an exemplary embodiment.

Figure 23:
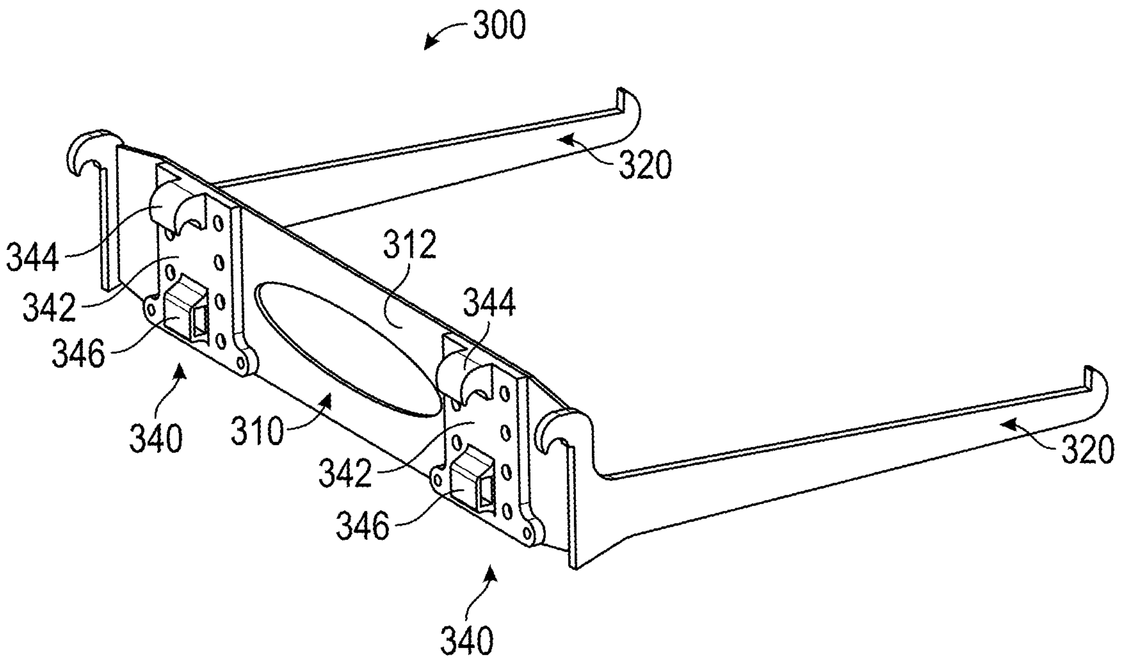
FIG. 23 is a rear perspective view of the second attachment of FIG. 16, according to another exemplary embodiment.

According to the exemplary embodiment shown in FIG. 23, the fork attachment 300 includes an alternative interface, shown as attachment interface 340. As shown in FIG. 23, the attachment interface 340 includes a plurality of plates, shown as plates 342. According to the exemplary embodiment shown in FIG. 23, the attachment interface 340 includes a pair of plates 342, one positioned to align with (i) each set of the first apertures 156 and the second apertures 158 of the attachment plate 150 and (ii) each movable retainer 157. In other embodiments, the attachment interface 340 includes a different number of plates 342 to correspond with a different number of (i) sets of the first apertures 156 and the second apertures 158 and (ii) the movable retainers 157 (e.g., one, three, etc.). As shown in FIG. 23, the plates 342 are coupled (e.g., fastened, welded, etc.) to the rear face 312 of the fork plate 310.

As shown in FIG. 23, each of the plates 342 includes a first connector, shown as upper hook 344, and a second connector, shown as lower pocket 346, extending therefrom. In other embodiments, the plates 342 include a different number of upper hooks 294 (e.g., two, three, etc.). According to an exemplary embodiment, the upper hooks 344 are configured to extend through and be received by the second apertures 158 such that the upper hooks 344 engage the first exposed portions 142 of the coupling tube 140. According to an exemplary embodiment, the lower pockets 346 are configured to extend through and be received by the first apertures 156. The lower pockets 346 are configured to receive the movable retainers 157 to secure the fork attachment 300 to the attachment assembly 100, according to an exemplary embodiment. By way of example, the movable retainers 157 of the attachment assembly 100 may replace the coupler 170 (e.g., when the container attachment 200 includes the attachment interface 290, when the fork attachment 300 includes the attachment interface 340, etc.).

Figure 24:
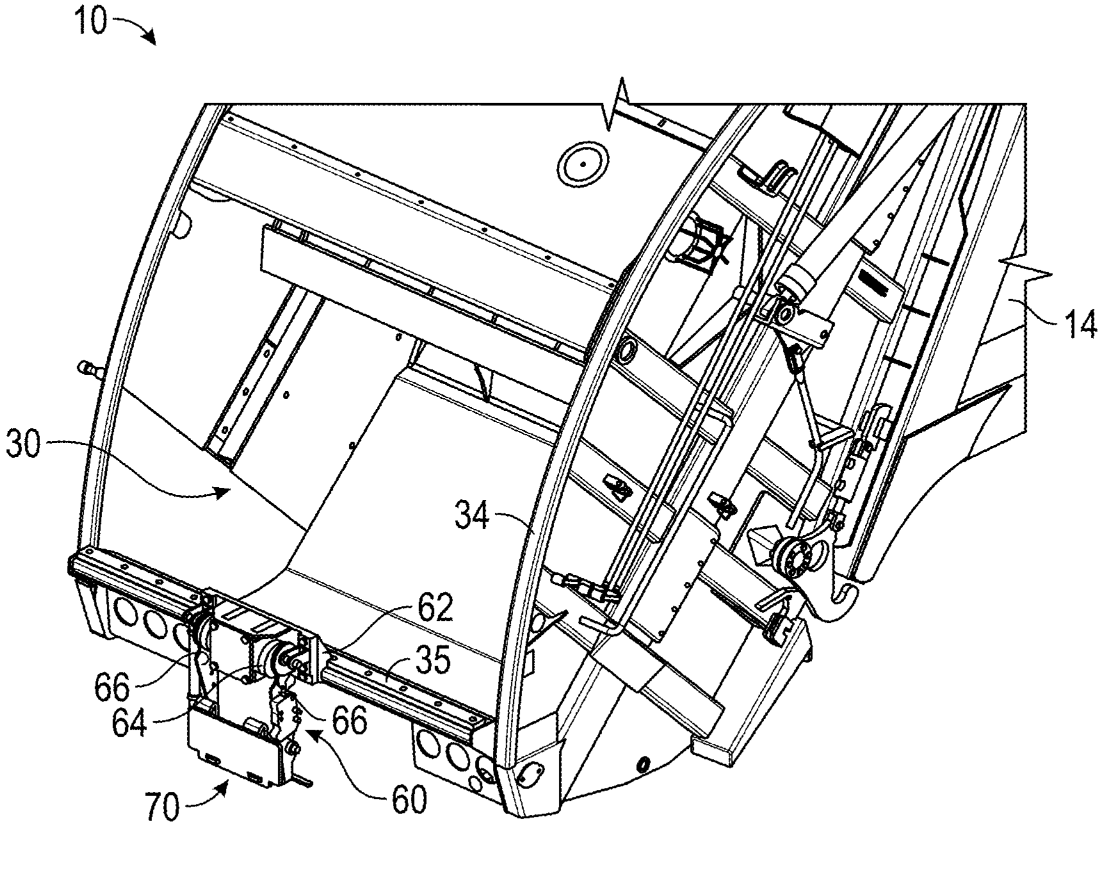
FIG. 24 is a rear perspective view of an attachment assembly of a refuse vehicle, according to still another exemplary embodiment.
Figure 25:
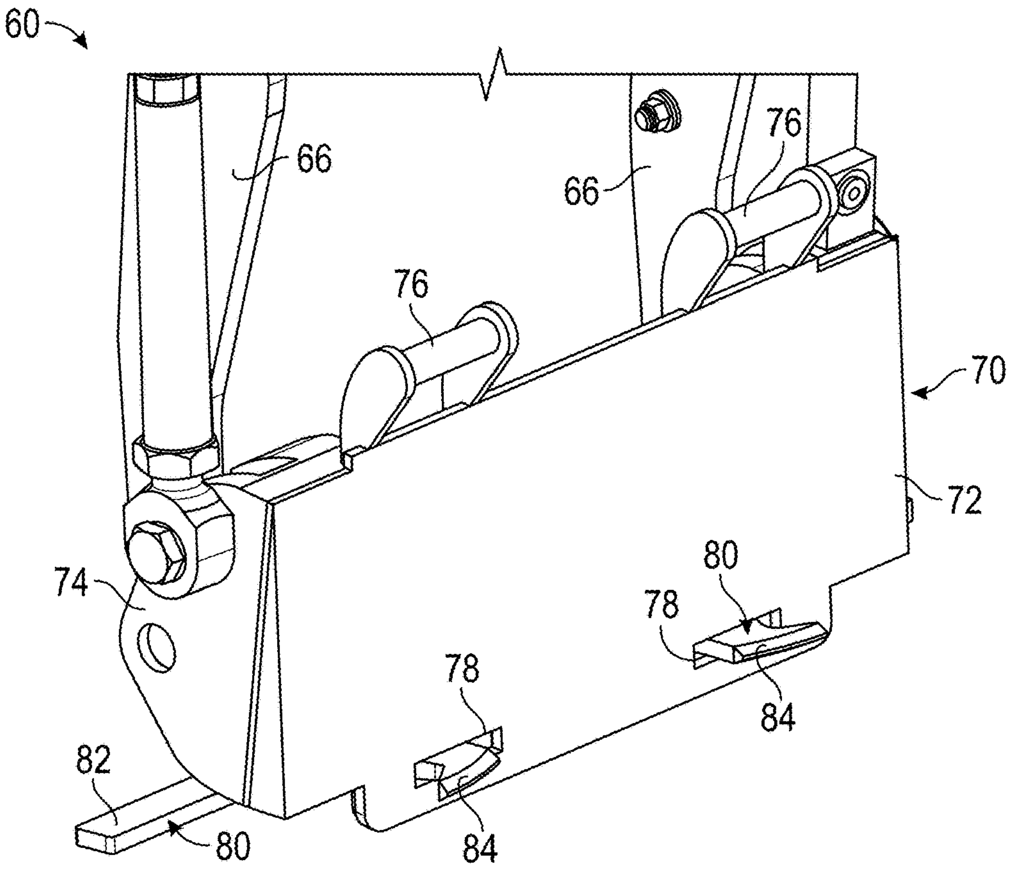
FIG. 25 is a front perspective view of the attachment assembly of FIG. 24, according to an exemplary embodiment.
Figure 26:
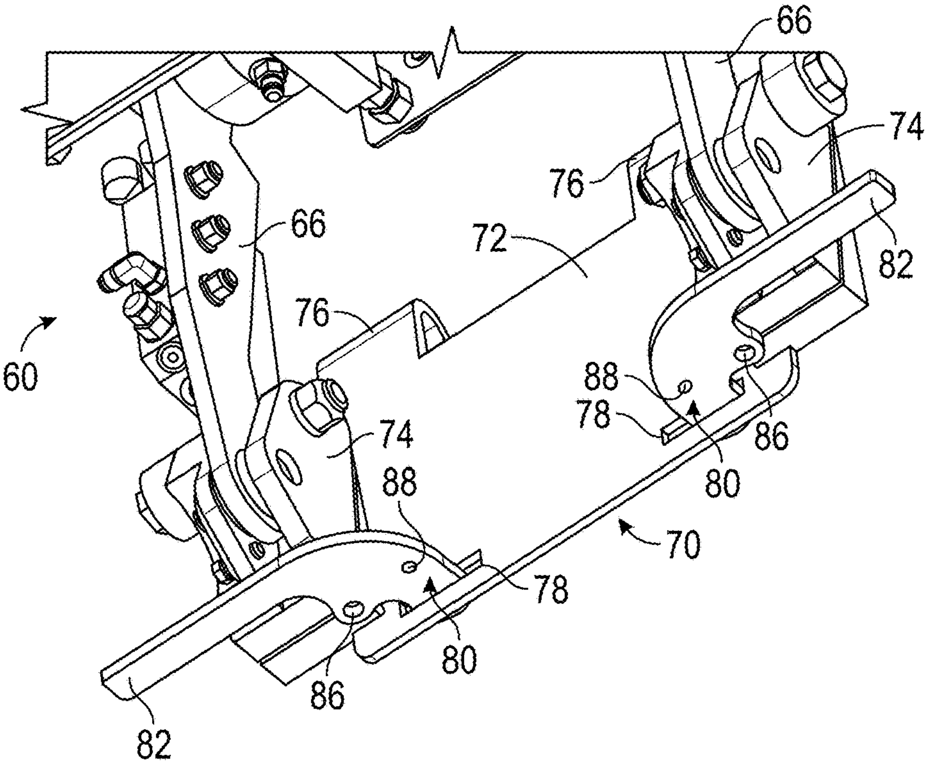
FIG. 26 is a rear perspective view of the attachment assembly of FIG. 24, according to an exemplary embodiment.
Figure 27:
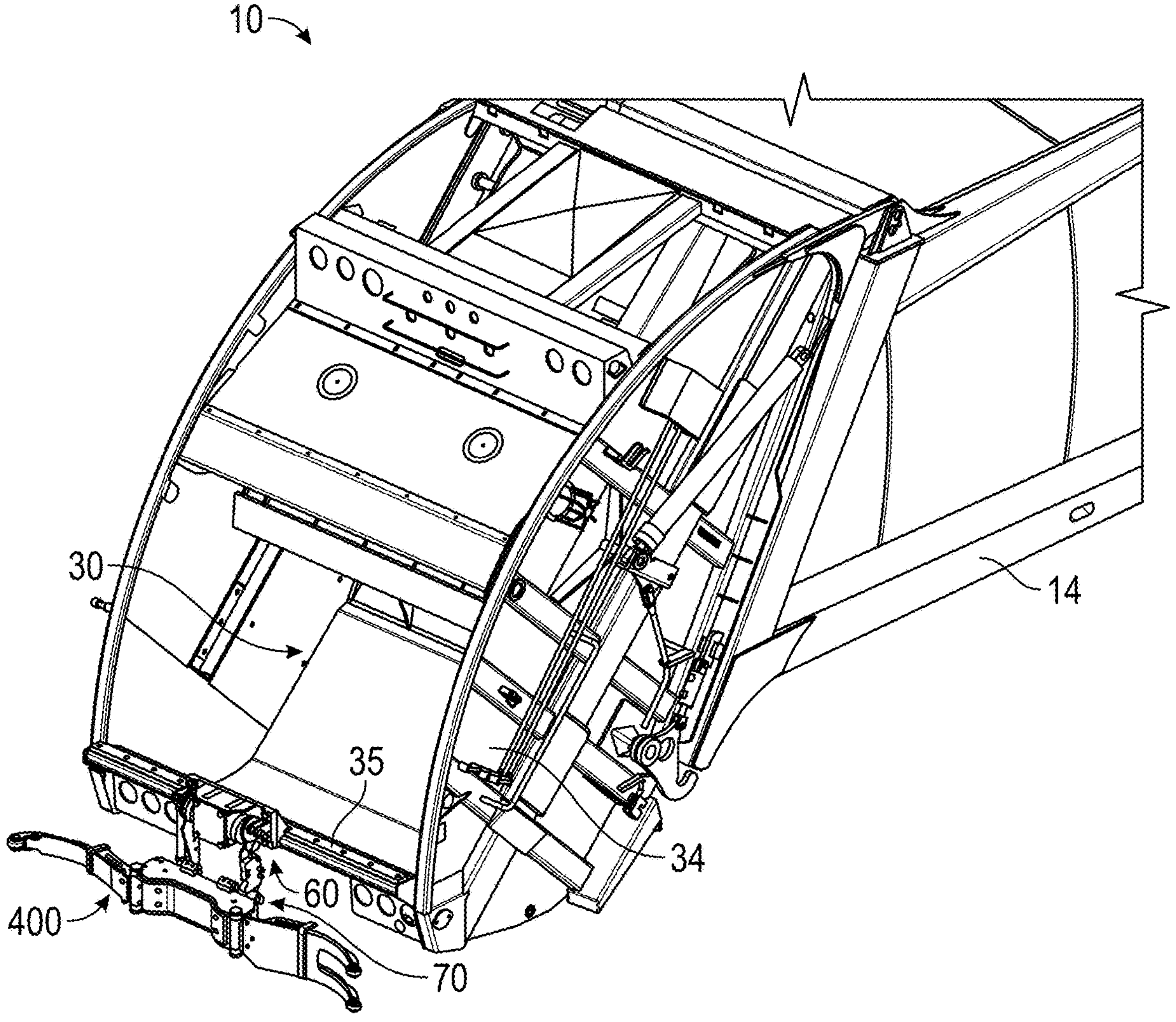
FIG. 27 is a perspective view of a third attachment coupled to the attachment assembly of FIG. 24, according to an exemplary embodiment.
Figure 28:
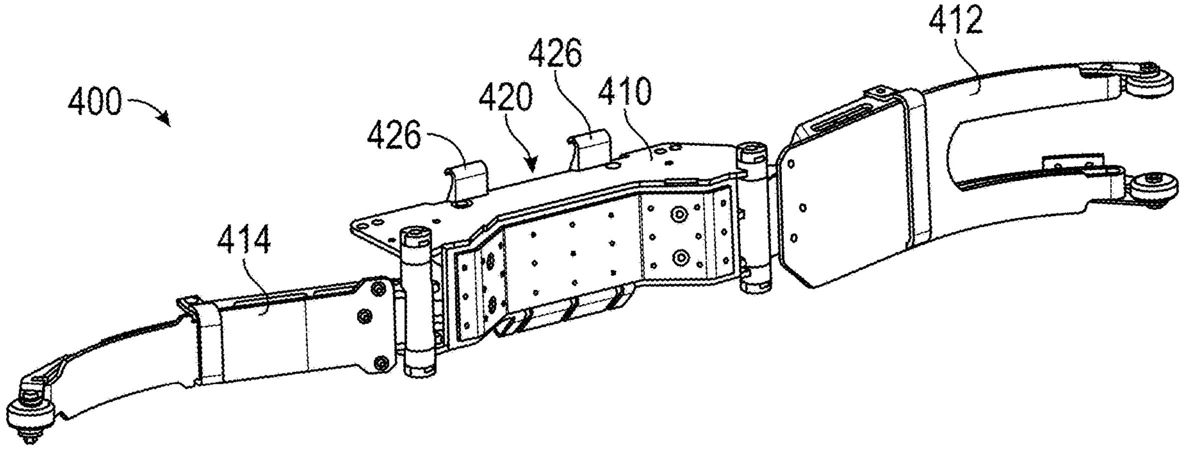
FIG. 28 is a front perspective view of the third attachment of FIG. 27, according to an exemplary embodiment.
Figure 29:
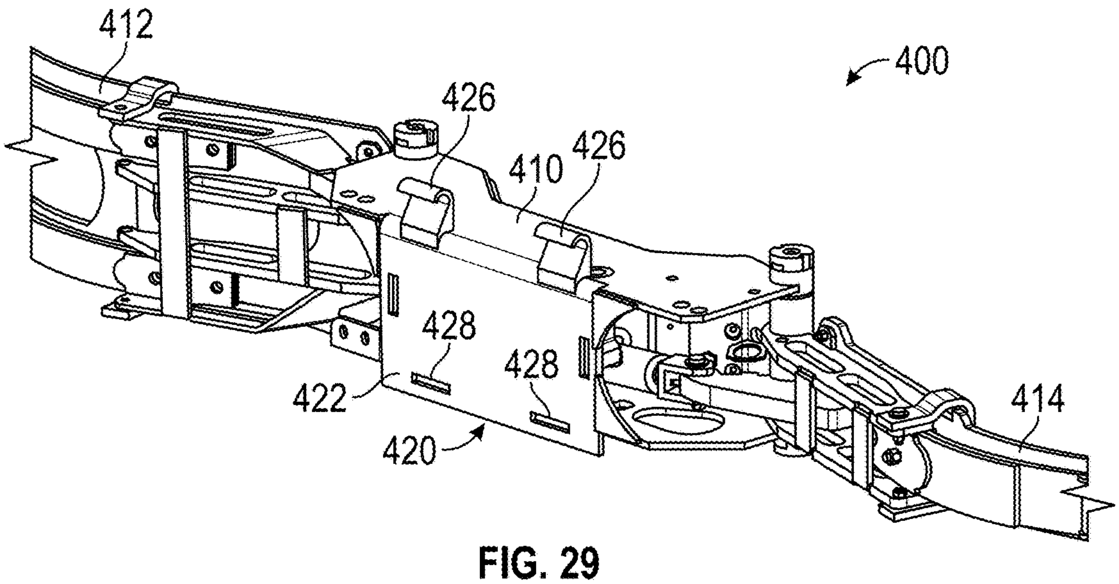
FIG. 29 is a rear perspective view of the third attachment of FIG. 27, according to an exemplary embodiment.
Figure 30:
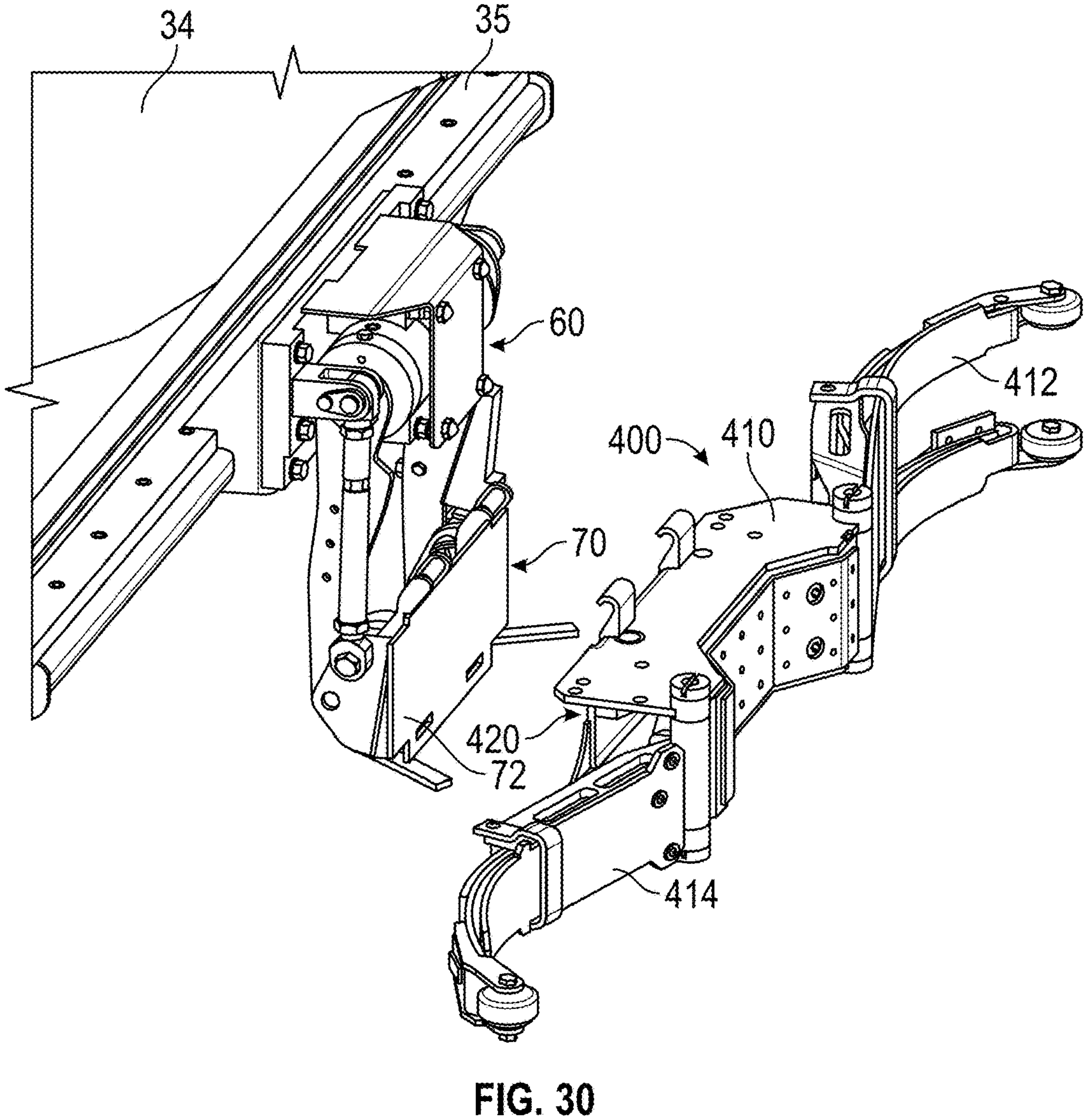
FIGS. 30-33 are various views visually detailing a method for coupling the third attachment to the attachment assembly of FIG. 24, according to an exemplary embodiment.

According to the exemplary embodiment shown in FIGS. 24-38, the refuse vehicle 10 is configured as a rear-loading refuse truck having a second attachment assembly, shown as attachment assembly 70. As shown in FIGS. 24-26, the refuse vehicle 10 includes a second lift mechanism/system (e.g., a rear-loading lift assembly, etc.), shown as lift assembly 60. The lift assembly 60 includes a base, shown as base 62; an driver, shown as lift actuator 64, and a pair of arms, shown as lift arms 66. As shown in FIG. 24, the base 62 is coupled to (e.g., fixed, fastened, secured, etc.) to a ledge, shown as rear bumper 35, of the tailgate 34. The lift arms 66 extend from the base 62. According to an exemplary embodiment, the lift actuator 64 is positioned to facilitate selectively pivoting the lift arms 66 about the base 62 such that the lift arms 66 may pivot towards and away from an opening of the refuse compartment 30 within the tailgate 34 (e.g., such that refuse may be dumped into the refuse compartment 30 from a refuse container through the tailgate 34 using the lift assembly 60, etc.).

As shown in FIGS. 24-27, 30-34, 37, and 38, the attachment assembly 70 is configured to couple to the lift assembly 60. In some embodiments, the attachment assembly 70 is additionally or alternatively configured to couple to the lift assembly 40. In some embodiments, the attachment assembly 100 is additionally or alternatively configured to couple to the lift assembly 60. As shown in FIGS. 25, 26, 30-33, 37, and 38, the attachment assembly 70 includes a plate, shown as attachment plate 72. As shown in FIGS. 25, 26, 31, 33, and 37, the attachment assembly 70 includes a pair of brackets, shown as coupling brackets 74, coupled at opposing sides of a rear surface of the attachment plate 72. Each of the coupling brackets 74 is configured to receive an end of a respective lift arm 66 to couple (e.g., pivotally couple, etc.) the attachment assembly 70 to the lift assembly 60. As shown in FIGS. 25, 26, 31, 33, and 37, the attachment plate 72 (*i*) has a first pair of interfaces, shown as arms 76, extending from a top end thereof and (ii) defines a second pair of interfaces, shown as first apertures 78, positioned proximate the bottom end thereof. In other embodiments, the attachment plate 72 includes a different number of arms 76 and/or first apertures 78 (e.g., one, three, four, etc.).

Figure 31:
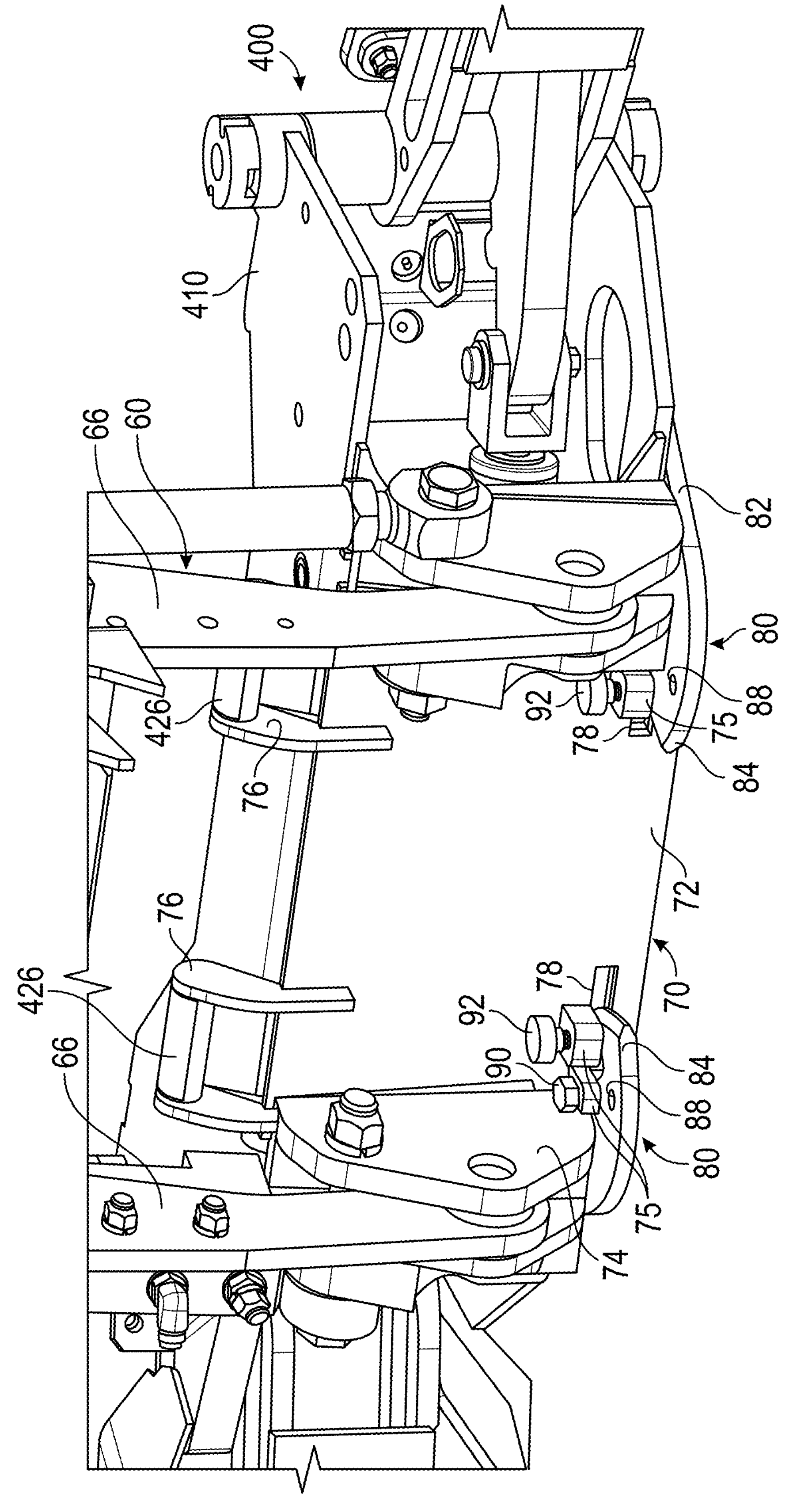

As shown in FIGS. 25, 26, 31-33, 37, and 38, the attachment assembly 70 includes a pair of locking mechanisms or latches, shown as locking levers 80, having a first portion (e.g., a handle portion, etc.), shown as handle 82, and a second portion (e.g., a latch portion, etc.), shown as retainer 84. As shown in FIGS. 26, 31, 32, and 38, the locking levers 80 define a first aperture, shown as pivot aperture 86, and a second aperture, shown as locking aperture 88. As shown in FIGS. 31-33, 37, and 38, the attachment assembly 70 includes a first pair of pins, shown as pivot pins 90. Each of the pivot pins 90 is positioned to extend through (i) a first aperture of a support, shown as mount 75, extending from each of the coupling brackets 74 and/or the attachment plate 72 and (ii) the pivot aperture 86 of a respective locking levers 80 to pivotally couple each of the locking levers 80 to a respective mount 75 of the attachment assembly 70. The handle 82 of the locking levers 80 facilitates manually pivoting the locking levers 80 about the pivot pins 90 between a first orientation or position (e.g., an unlocked orientation, a disengaged orientation, as shown in FIG. 31, etc.) and a second orientation or position (e.g., a locked orientation, an engaged orientation, as shown in FIGS. 25, 26, 32, 33, 37, and 38, etc.). As shown in FIG. 31, the retainers 84 of the locking levers 80 are configured to retract from the first apertures 78 of the attachment plate 72 when the locking levers 80 are arranged in the first orientation. As shown in FIGS. 25, 26, 32, 33, 37, and 38, the retainers 84 of the locking levers 80 are configured to extend through the first apertures 78 of the attachment plate 72 when the locking levers 80 are arranged in the second orientation.

As shown in FIGS. 31-33, 37, and 38, the attachment assembly 70 includes a second pair of pins, shown as locking pins 92. Each of the locking pins 92 is positioned to selectively extend through (i) a second aperture of a respective mount 75 and (ii) the locking aperture 88 of a respective locking levers 80 to pivotally secure the locking levers 80 in the second orientation. According to an exemplary embodiment, the locking pins 92 are spring loaded pins the snap into place (e.g., extend through the locking apertures 88, etc.) in response to the locking levers 80 being positioned into the second orientation. The locking pins 92 may thereafter be pulled on or lifted to release the locking levers 80 from the second orientation.

Figure 37:
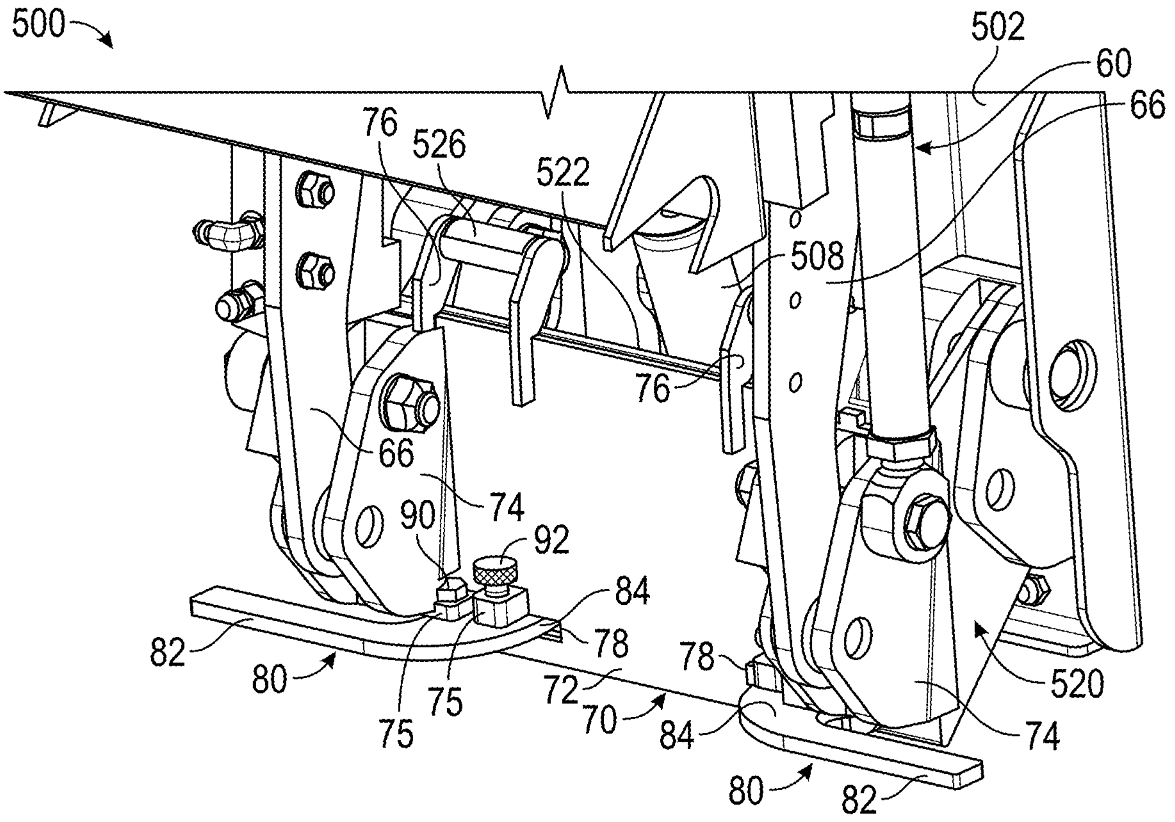
FIGS. 37 and 38 are various views of the fourth attachment coupled the attachment assembly of FIG. 24, according to an exemplary embodiment.
Figure 38:
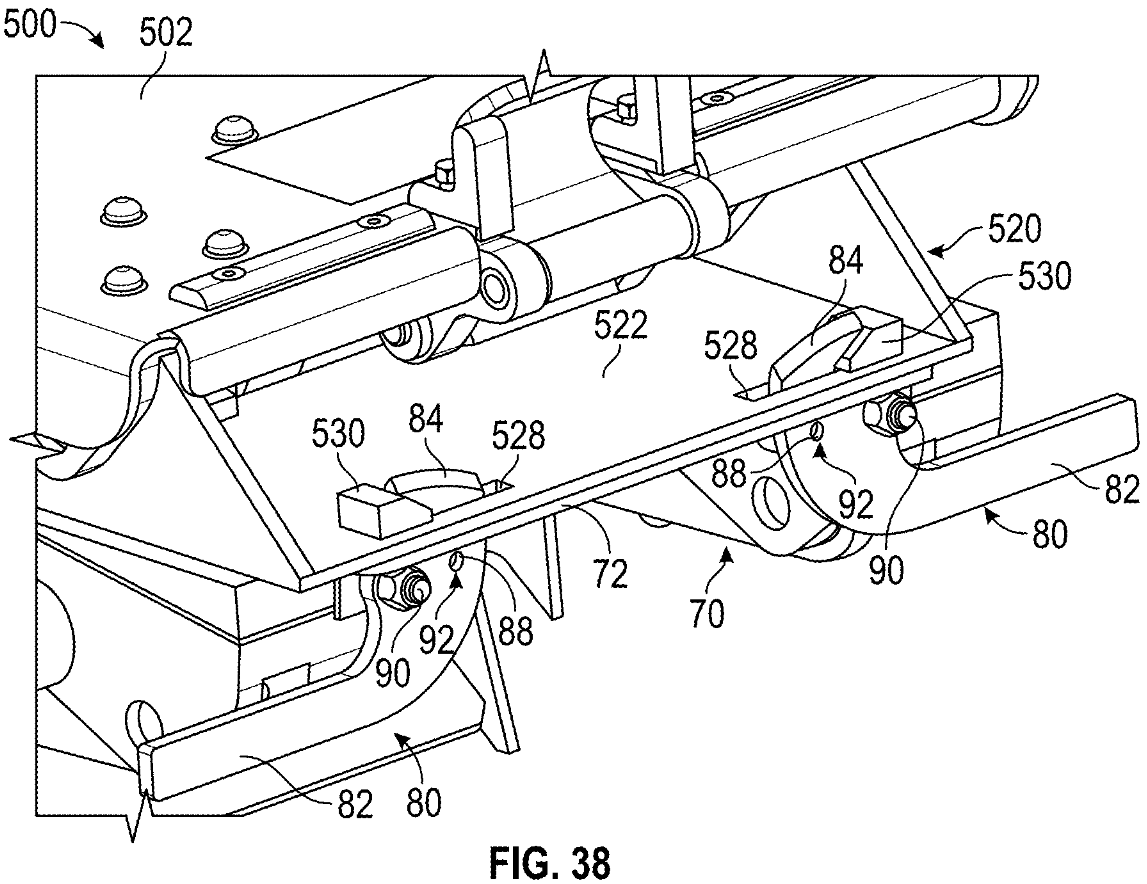

As shown in FIGS. 27 and 30-33, the attachment assembly 70 is configured to engage with a third attachment, shown as grabber attachment 400, to selectively and releasably secure the grabber attachment 400 to the lift assembly 60. As shown in FIGS. 34, 37, and 38, the attachment assembly 70 is configured to engage with a fourth attachment, shown as cart tipper attachment 500, to selectively and releasably secure the cart tipper attachment 500 to the lift assembly 60. In other embodiments, the attachment assembly 70 is configured to engage with another type of attachment (e.g., a salt dispenser attachment, a towing attachment, a wood chipper attachment, a bucket attachment, the container attachment 200, the fork attachment 300, etc.).

As shown in FIGS. 28-33, the grabber attachment 400 includes a main portion, shown as base 410, having a first extension, shown as first arm 412, and a second extension, shown as second arm 414, pivotally coupled thereto. According to an exemplary embodiment, the first arm 412 and the second arm 414 are selectively pivotable (e.g., with actuators, etc.) to facilitate grabbing an object (e.g., a refuse container, a trash can, a recycling bin, etc.). As shown in FIGS. 28-32, the grabber attachment 400 includes an interface, shown as attachment interface 420 including a plate, shown as backplate 422, coupled to (e.g., fastened, fixed, secured, welded, integral with, etc.) the rear of the base 410. The backplate 422 has a first pair of interfaces, shown as hooks 426, extending from a top end thereof and (ii) defines a second pair of interfaces, shown as second apertures 428, positioned proximate the bottom end thereof. In other embodiments, the backplate 422 includes a different number of hooks 426 and/or second apertures 428 (e.g., one, three, four, etc.).

Figure 32:
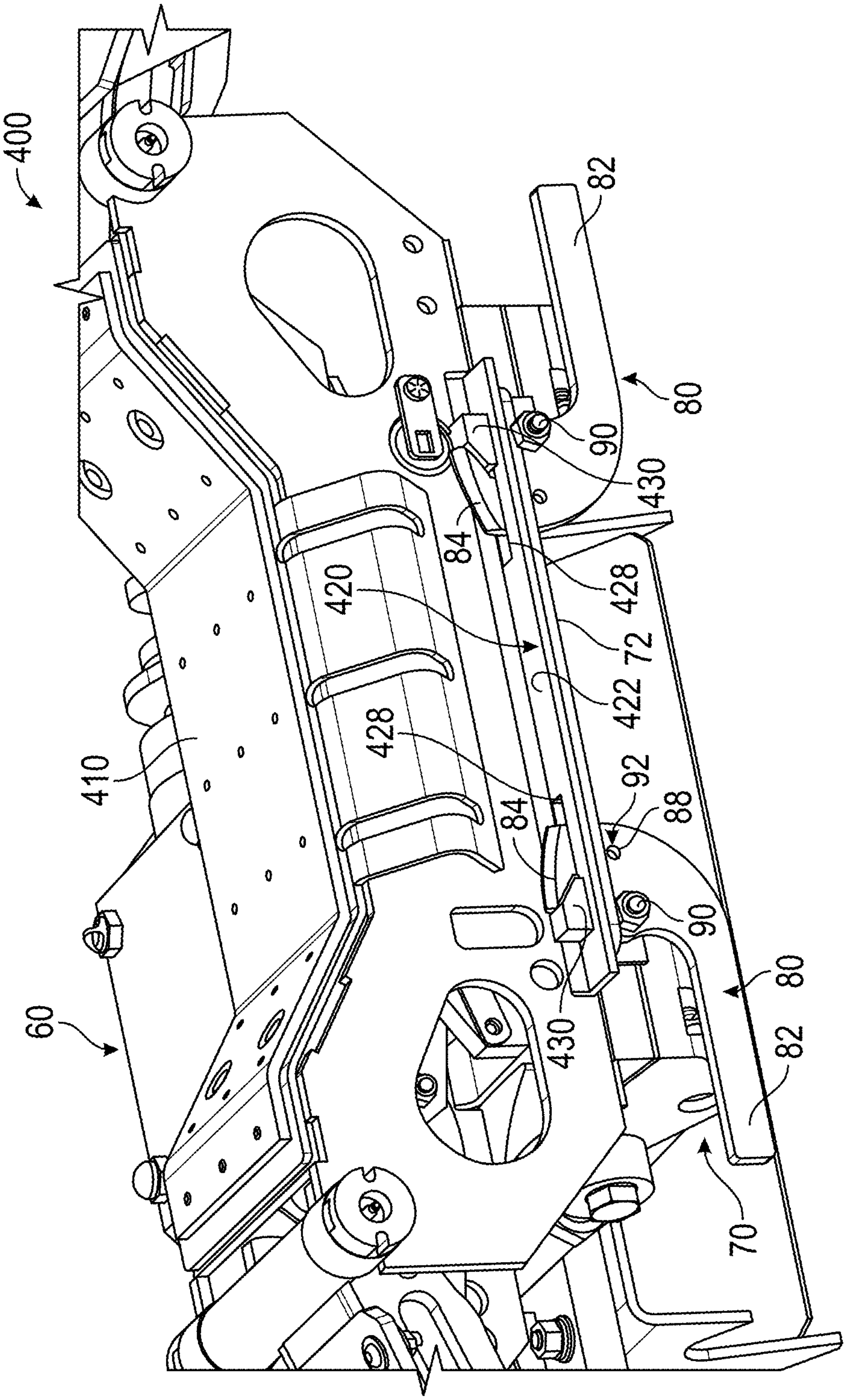
Figure 33:
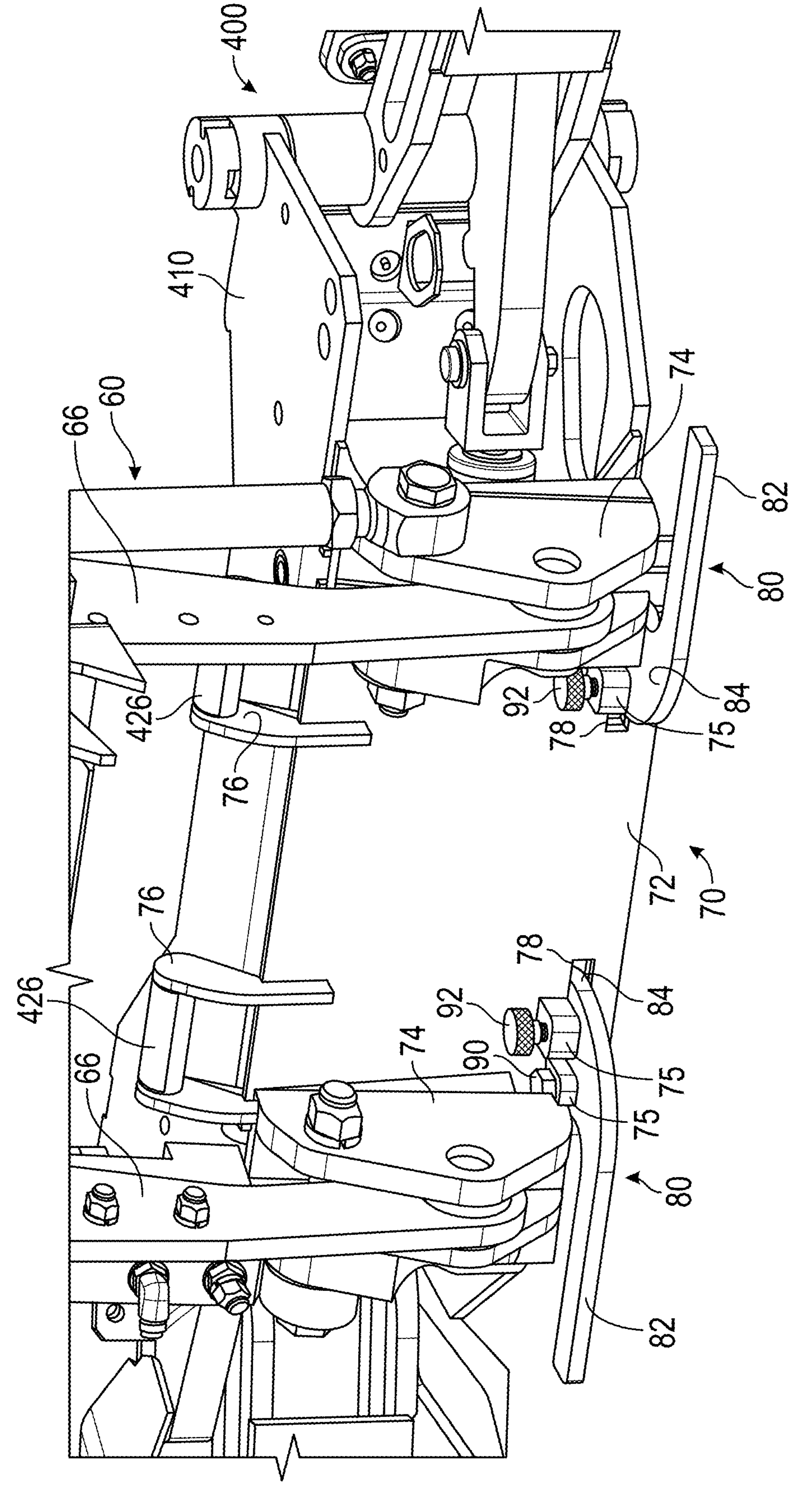
Figure 34:
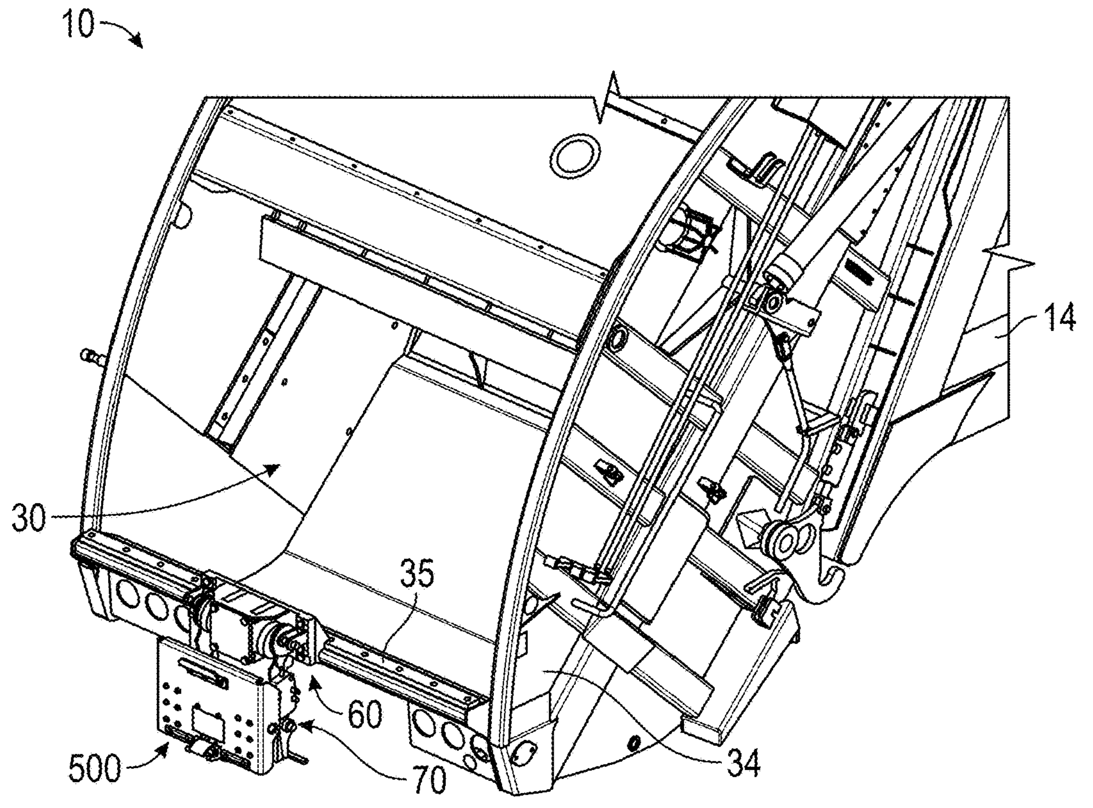
FIG. 34 is a perspective view of a fourth attachment coupled to the attachment assembly of FIG. 24, according to an exemplary embodiment.

As shown in FIGS. 30-33, the attachment interface 420 of the grabber attachment 400, the attachment plate 72 of the attachment assembly 70, and the locking levers 80 of the attachment assembly 70 facilitate releasably coupling and securing the grabber attachment 400 to the attachment assembly 70. As shown in FIGS. 31-33, the backplate 422 of the attachment interface 420 is configured to engage with the attachment plate 72 of the attachment assembly 70 such that the hooks 426 of the backplate 422 engage with the arms 76 of the attachment plate 72 and the second apertures 428 of the backplate 422 align with the first apertures 78 of the attachment plate 72. As shown in FIGS. 32 and 33, the retainers 84 of the locking levers 80 are configured to extend through the first apertures 78 of the attachment plate 72 and the second apertures 428 of the backplate 422 when in the second orientation such that each of the retainers 84 engage a respective protrusion, shown as tab 430, extending from the backplate 422. According to the exemplary embodiment shown in FIG. 32, the retainers 84 and the tabs 430 have complementary angled profiles. According to an exemplary embodiment, engagement between the retainers 84 and the tabs 430 pulls (e.g., compresses, etc.) the backplate 422 of the grabber attachment 400 against the attachment plate 72 of the attachment assembly 70 to releasably secure the grabber attachment 400 to the attachment assembly 70.

In operation, the grabber attachment 400 may be coupled to the attachment assembly 70 using the following method. First, the locking levers 80 may be arranged in the first orientation (e.g., the unlocked orientation, etc.). Second, the grabber attachment 400 may be interfaced with the attachment assembly 70 such that (i) the hooks 426 of the backplate 422 interface with the arms 76 of the attachment plate 72 and (ii) the second apertures 428 of the backplate 422 align with the first apertures 78 of the attachment plate 72. Third, the locking levers 80 may be manually pivoted from the first orientation to the second orientation (e.g., the locked orientation, etc.) such that the retainers 84 extend through the first apertures 78 of the attachment plate 72 and the second apertures 428 of the backplate 422. Pivoting the locking levers 80 from the first orientation to the second orientation causes the retainers 84 to engage the tabs 430 on the backplate 422 such that the backplate 422 is pulled towards the attachment plate 72 and secured thereto. Further, the locking pins 92 may be manually inserted or automatically actuated into the locking apertures 88 of the locking levers 80 to secure the locking levers 80 in the second orientation and prevent inadvertent disengagement between the retainers 84 and the tabs 430. Fourth, the locking pins 92 may be removed from the locking apertures 88 and the locking levers 80 pivoted from the second orientation back to the first orientation to release the grabber attachment 400 from the attachment assembly 70 such that the grabber attachment 400 may be maintained, repaired, replaced, swapped, etc.

Figure 35:
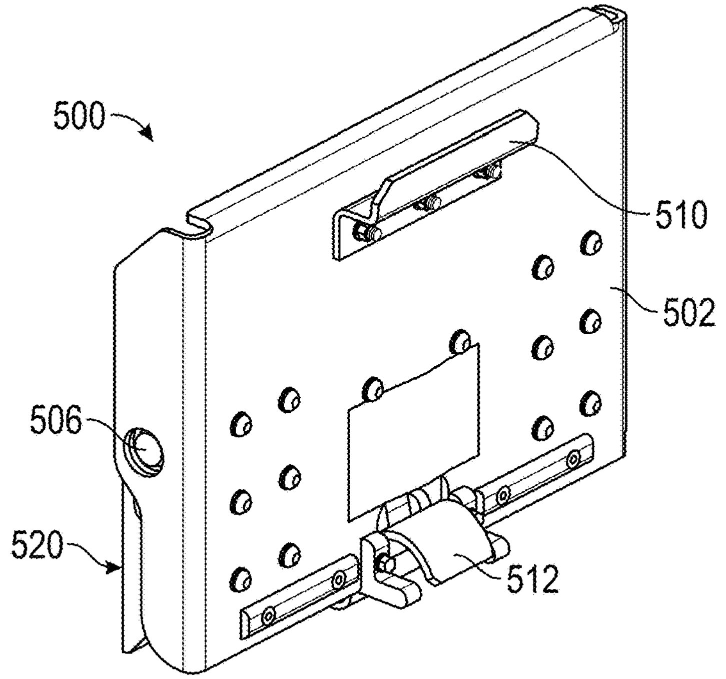
FIG. 35 is a front perspective view of the fourth attachment of FIG. 34, according to an exemplary embodiment.
Figure 36:
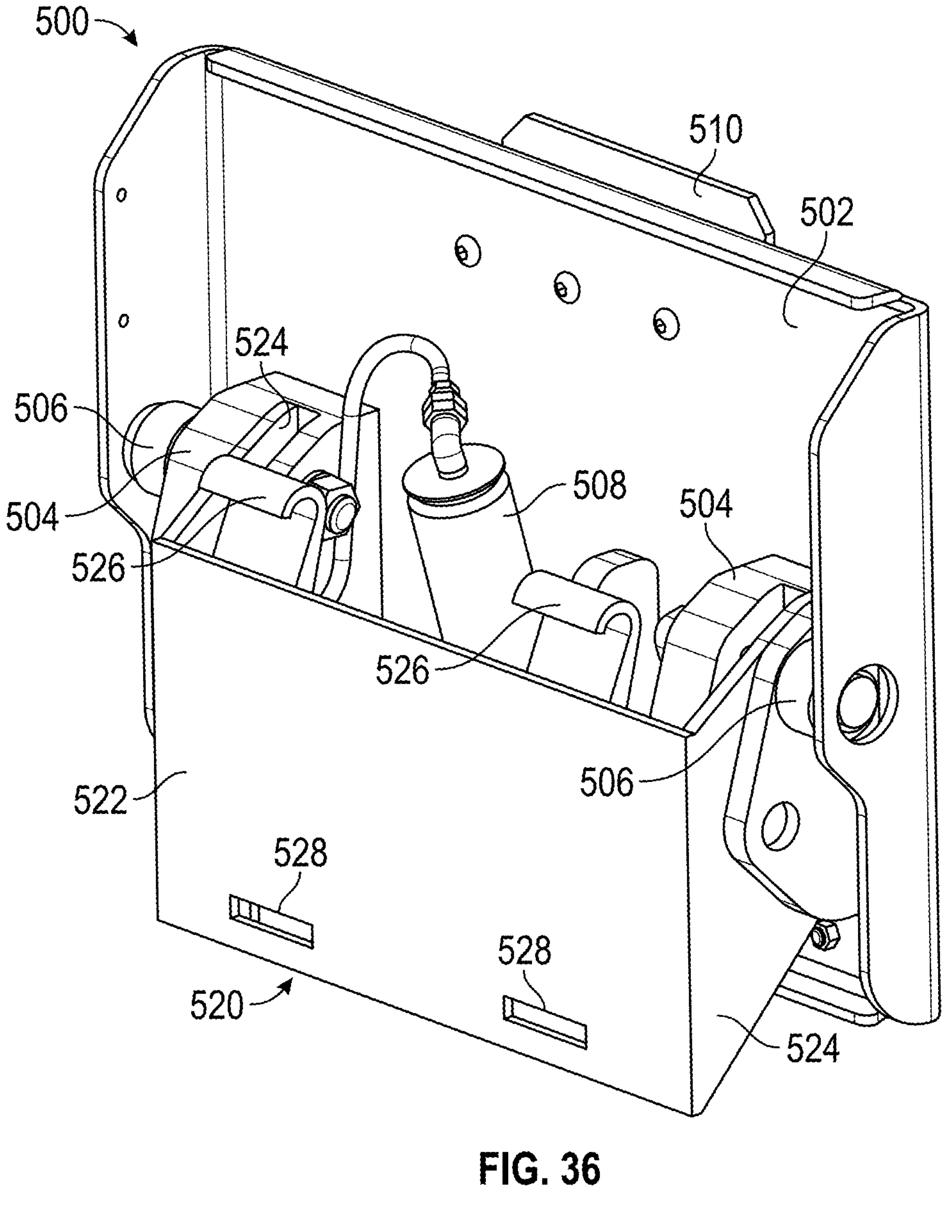
FIG. 36 is a rear perspective view of the fourth attachment of FIG. 34, according to an exemplary embodiment.

As shown in FIGS. 35-38, the cart tipper attachment 500 includes a first plate, shown as front plate 502, and an interface, shown as attachment interface 520, including a second plate, shown as backplate 522. As shown in FIG. 36, the cart tipper attachment 500 include a pair of brackets, shown as coupling brackets 504, coupled at opposing sides of a rear surface of the front plate 502. The backplate 522 of the attachment interface 520 includes a pair of extensions, shown as flanges 524, that extend perpendicularly from opposing end of the backplate 522. The flanges 524 are configured to interface with the coupling brackets 504, coupling the front plate 502 and the backplate 522. According to the exemplary embodiment shown in FIG. 36, each set of coupling brackets 504 and flanges 524 cooperatively receives a respective pin, shown as pivot pin 506, such that the front plate 502 is pivotally coupled to the backplate 522. In other embodiments, the front plate 502 is fixed relative to the backplate 522. As shown in FIG. 36, the cart tipper attachment 500 includes an actuator (e.g., hydraulic cylinder, pneumatic cylinder, etc.), shown as tipper actuator 508, positioned between the front plate 502 and the backplate 522. According to an exemplary embodiment, the tipper actuator 508 is positioned to pivot the front plate 502 relative to the backplate 522. As shown in FIGS. 35 and 36, the cart tipper attachment 500 includes a first interface, shown as upper flange 510, and a second interface, shown as lower flange 512 configured to facilitate interlocking with and lifting an object (e.g., a refuse container, a trash can, a recycling bin, a cart, etc.) with the cart tipper attachment 500.

As shown in FIGS. 36-38, the backplate 522 has a first pair of interfaces, shown as hooks 526, extending from a top end thereof and (ii) defines a second pair of interfaces, shown as second apertures 528, positioned proximate the bottom end thereof. In other embodiments, the backplate 522 includes a different number of hooks 526 and/or second apertures 528 (e.g., one, three, four, etc.). According to an exemplary embodiment, the attachment interface 520 of the cart tipper attachment 500, the attachment plate 72 of the attachment assembly 70, and the locking levers 80 of the attachment assembly 70 facilitate releasably coupling and securing the cart tipper attachment 500 to the attachment assembly 70. As shown in FIGS. 37 and 38, the backplate 522 of the attachment interface 520 is configured to engage with the attachment plate 72 of the attachment assembly 70 such that the hooks 526 of the backplate 522 engage with the arms 76 of the attachment plate 72 and the second apertures 528 of the backplate 522 align with the first apertures 78 of the attachment plate 72. The retainers 84 of the locking levers 80 are configured to extend through the first apertures 78 of the attachment plate 72 and the second apertures 528 of the backplate 522 when in the second orientation such that each of the retainers 84 engage a respective protrusion, shown as tab 530, extending from the backplate 522. According to the exemplary embodiment shown in FIG. 38, the retainers 84 and the tabs 530 have complementary angled profiles. According to an exemplary embodiment, engagement between the retainers 84 and the tabs 530 pulls (e.g., compresses, etc.) the backplate 522 of the cart tipper attachment 500 against the attachment plate 72 of the attachment assembly 70 to releasably secure the cart tipper attachment 500 to the attachment assembly 70.

In operation, the cart tipper attachment 500 may be coupled to the attachment assembly 70 using the following method. First, the locking levers 80 may be arranged in the first orientation (e.g., the unlocked orientation, etc.). Second, the cart tipper attachment 500 may be interfaced with the attachment assembly 70 such that (i) the hooks 526 of the backplate 522 interface with the arms 76 of the attachment plate 72 and (ii) the second apertures 528 of the backplate 522 align with the first apertures 78 of the attachment plate 72. Third, the locking levers 80 may be manually pivoted from the first orientation to the second orientation (e.g., the locked orientation, etc.) such that the retainers 84 extend through the first apertures 78 of the attachment plate 72 and the second apertures 528 of the backplate 522. Pivoting the locking levers 80 from the first orientation to the second orientation causes the retainers 84 to engage the tabs 530 on the backplate 522 such that the backplate 522 is pulled towards the attachment plate 72 and secured thereto. Further, the locking pins 92 may be manually inserted or automatically actuated into the locking apertures 88 of the locking levers 80 to secure the locking levers 80 in the second orientation and prevent inadvertent disengagement between the retainers 84 and the tabs 530. Fourth, the locking pins 92 may be removed from the locking apertures 88 and the locking levers 80 pivoted from the second orientation back to the first orientation to release the cart tipper attachment 500 from the attachment assembly 70 such that the cart tipper attachment 500 may be maintained, repaired, replaced, swapped, etc.

Figure 39:
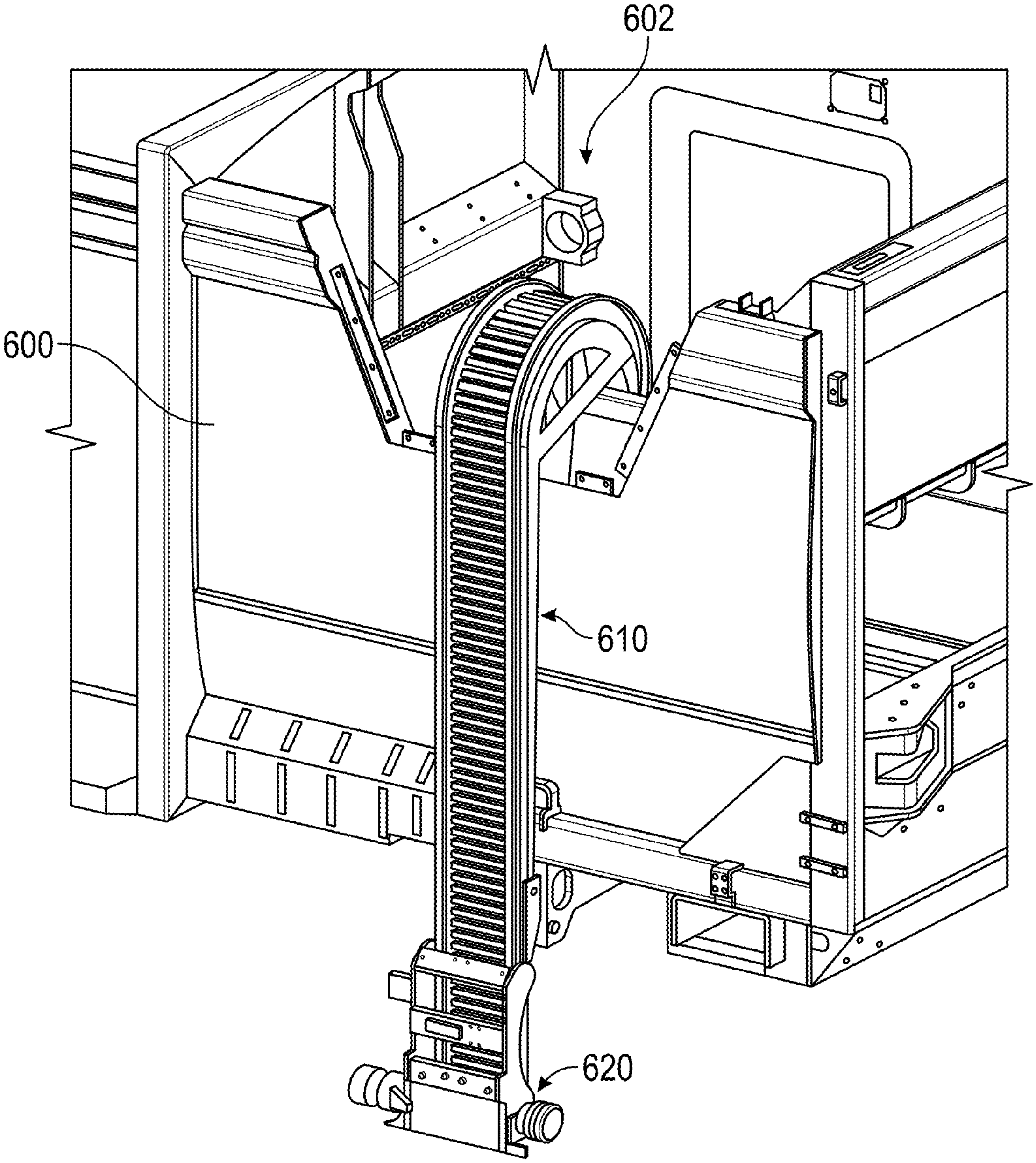
FIG. 39 is a side perspective view of an attachment assembly of a refuse vehicle, according to yet another exemplary embodiment.
Figure 40:
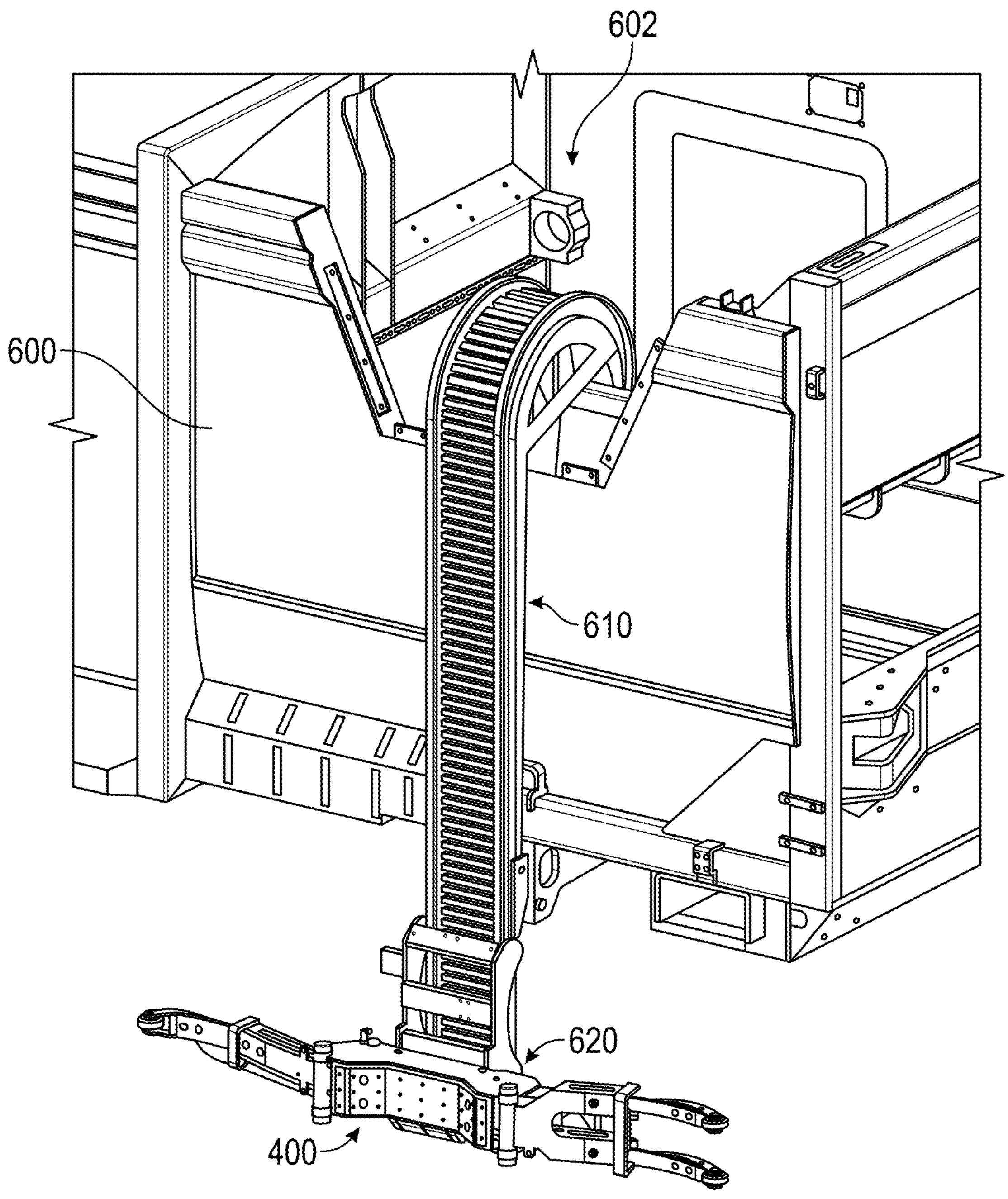
FIG. 40 is a side perspective view of the third attachment of FIG. 27 coupled to the attachment assembly of FIG. 39, according to an exemplary embodiment.
Figure 41:
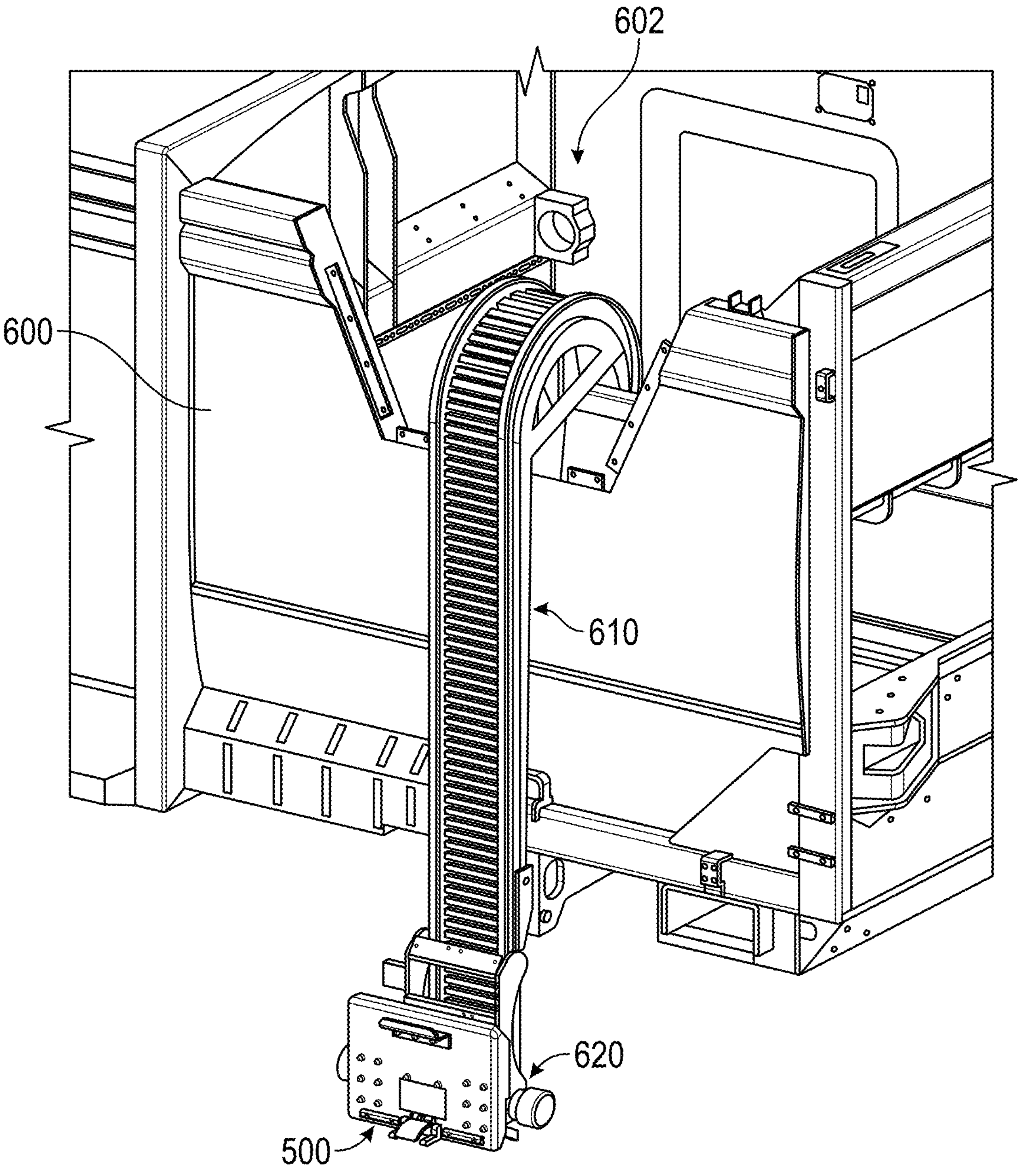
FIG. 41 is a side perspective view of the fourth attachment of FIG. 34 coupled to the attachment assembly of FIG. 39, according to an exemplary embodiment.

According to the exemplary embodiment shown in FIGS. 39-41, the refuse vehicle 10 is configured as a side-loading refuse truck having a container (e.g., similar to refuse container 202, etc.), shown as refuse container 600, including a third lift mechanism/system (e.g., a side-loading lift assembly, etc.), shown as lift assembly 610, and third attachment assembly, shown as attachment assembly 620. The attachment assembly 620 may be similar to the attachment assembly 70 and/or the attachment assembly 100. As shown in FIG. 40 the attachment assembly 620 is configured to engage with the grabber attachment 400 to selectively and releasably secure the grabber attachment 400 to the lift assembly 610. As shown in FIG. 41, the attachment assembly 620 is configured to engage with the cart tipper attachment 500 to selectively and releasably secure the cart tipper attachment 500 to the lift assembly 610. In other embodiments, the attachment assembly 620 is configured to engage with another type of attachment (e.g., a bucket attachment, the container attachment 200, the fork attachment 300, etc.). According to an exemplary embodiment, the lift assembly 610 is configured to facilitate lifting an object (e.g., a refuse container, a trash can, a recycling bin, etc.) such that the contents therein (e.g., refuse, trash, garbage, etc.) may be dumped into a cavity, shown as refuse compartment 602, of the refuse container 600.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A refuse vehicle system comprising:

a refuse vehicle including:

a chassis;

a refuse body coupled to the chassis;

a cab coupled to the chassis; and a lift assembly coupled to at least one of the chassis or the refuse body, the lift assembly extending forward of the cab, the lift assembly including:

a pair of lift arms having proximal ends coupled to the at least one of the chassis or the refuse body;

one or more first actuators configured to pivot the pair of lift arms;

an attachment assembly coupled to distal ends of the pair of lift arms; and one or more second actuators; and a carry can coupled to the attachment assembly, the carry can including:

a refuse container;

an articulating collection arm coupled to the refuse container; and an attachment interface coupled directly to a rear wall of the refuse container, the attachment interface including a first mounting interface and a second mounting interface spaced from the first mounting interface, the first mounting interface and the second mounting interface positioned along the rear wall and configured to engage with the attachment assembly to couple the carry can to the lift assembly with a fork-less attachment;

wherein the one or more second actuators are configured to pivot at least one of the attachment assembly or the carry can relative to the pair of lift arms.

2. The refuse vehicle system of claim 1, wherein the attachment interface includes a support coupled to the rear wall and extending between the first mounting interface and the second mounting interface.

3. The refuse vehicle system of claim 1, wherein each of the first mounting interface and the second mounting interface defines an aperture that receives a component of the attachment assembly.

4. The refuse vehicle system of claim 1, wherein each of the first mounting interface and the second mounting interface includes a hook that engages with a portion of the attachment assembly.

5. The refuse vehicle system of claim 1, wherein the attachment interface includes:

a first bracket coupled to the rear wall, wherein the first mounting interface is coupled to the first bracket such that the first mounting interface is spaced rearward of the rear wall; and a second bracket coupled to the rear wall, wherein the second mounting interface is coupled to the second bracket such that the second mounting interface is spaced rearward of the rear wall.

6. The refuse vehicle system of claim 1, wherein the one or more first actuators include two first actuators.

7. The refuse vehicle system of claim 1, wherein the one or more second actuators include two second actuators.

8. The refuse vehicle system of claim 1, wherein the one or more second actuators are configured to pivot the attachment assembly relative to the pair of lift arms.

9. The refuse vehicle system of claim 1, wherein the one or more second actuators are configured to pivot the carry can relative to the pair of lift arms.

10. The refuse vehicle system of claim 1, wherein the one or more second actuators are configured to pivot the attachment assembly and the carry can relative to the pair of lift arms.

11. A refuse vehicle system comprising:

a refuse vehicle including:

a chassis;

a refuse body coupled to the chassis;

a cab coupled to the chassis; and a lift assembly coupled to at least one of the chassis or the refuse body, the lift assembly extending forward of the cab, the lift assembly including:

a pair of lift arms having proximal ends coupled to the at least one of the chassis or the refuse body;

one or more first actuators configured to pivot the pair of lift arms;

an attachment assembly coupled to distal ends of the pair of lift arms; and one or more second actuators; and a carry can coupled to the attachment assembly, the carry can including:

a refuse container;

an articulating collection arm coupled to the refuse container; and an attachment interface coupled to the refuse container, the attachment interface including a first mounting interface and a second mounting interface spaced from the first mounting interface, the first mounting interface and the second mounting interface configured to engage with the attachment assembly to couple the carry can to the lift assembly with a fork-less attachment, each of the first mounting interface and the second mounting interface defining an aperture that receives a component of the attachment assembly;

wherein the one or more second actuators are configured to pivot at least one of the attachment assembly or the carry can relative to the pair of lift arms.

12. The refuse vehicle system of claim 11, wherein the attachment interface is coupled directly to a rear wall of the refuse container.

13. The refuse vehicle system of claim 12, wherein the attachment interface includes a support coupled to the rear wall and extending between the first mounting interface and the second mounting interface.

14. The refuse vehicle system of claim 12, wherein the attachment interface includes:

a first bracket coupled to the rear wall, wherein the first mounting interface is coupled to the first bracket such that the first mounting interface is spaced rearward of the rear wall; and a second bracket coupled to the rear wall, wherein the second mounting interface is coupled to the second bracket such that the second mounting interface is spaced rearward of the rear wall.

15. The refuse vehicle system of claim 1, wherein each of the first mounting interface and the second mounting interface includes a hook that engages with a portion of the attachment assembly.

16. A refuse vehicle system comprising:

a carry can configured to couple to an attachment assembly of a refuse vehicle, the carry can including:

a refuse container; and an attachment interface coupled to the refuse container, the attachment interface including a first mounting interface and a second mounting interface spaced from the first mounting interface, the first mounting interface and the second mounting interface configured to engage with the attachment assembly to couple the carry can to a lift assembly of the refuse vehicle with a fork-less attachment, each of the first mounting interface and the second mounting interface defining an aperture that receives a component of the attachment assembly.

17. The refuse vehicle system of claim 16, further comprising the refuse vehicle.

18. The refuse vehicle system of claim 16, wherein the carry can includes an articulating collection arm.

19. The refuse vehicle system of claim 16, wherein the attachment interface includes:

a first structure coupled to a rear wall of the refuse container, wherein the first mounting interface is coupled to the first structure such that the first mounting interface is spaced rearward of the rear wall; and a second structure coupled to the rear wall, wherein the second mounting interface is coupled to the second structure such that the second mounting interface is spaced rearward of the rear wall.

20. The refuse vehicle system of claim 19, wherein the attachment interface includes a support coupled to the rear wall and extending between the first structure and the second structure.

* * * * *